Oct. 6, 1942.　　　G. W. DUNHAM　　　2,297,694
WASHING MACHINE
Filed March 25, 1939　　10 Sheets-Sheet 1

Inventor:
George W. Dunham,
by Harry E. Dunham
His Attorney.

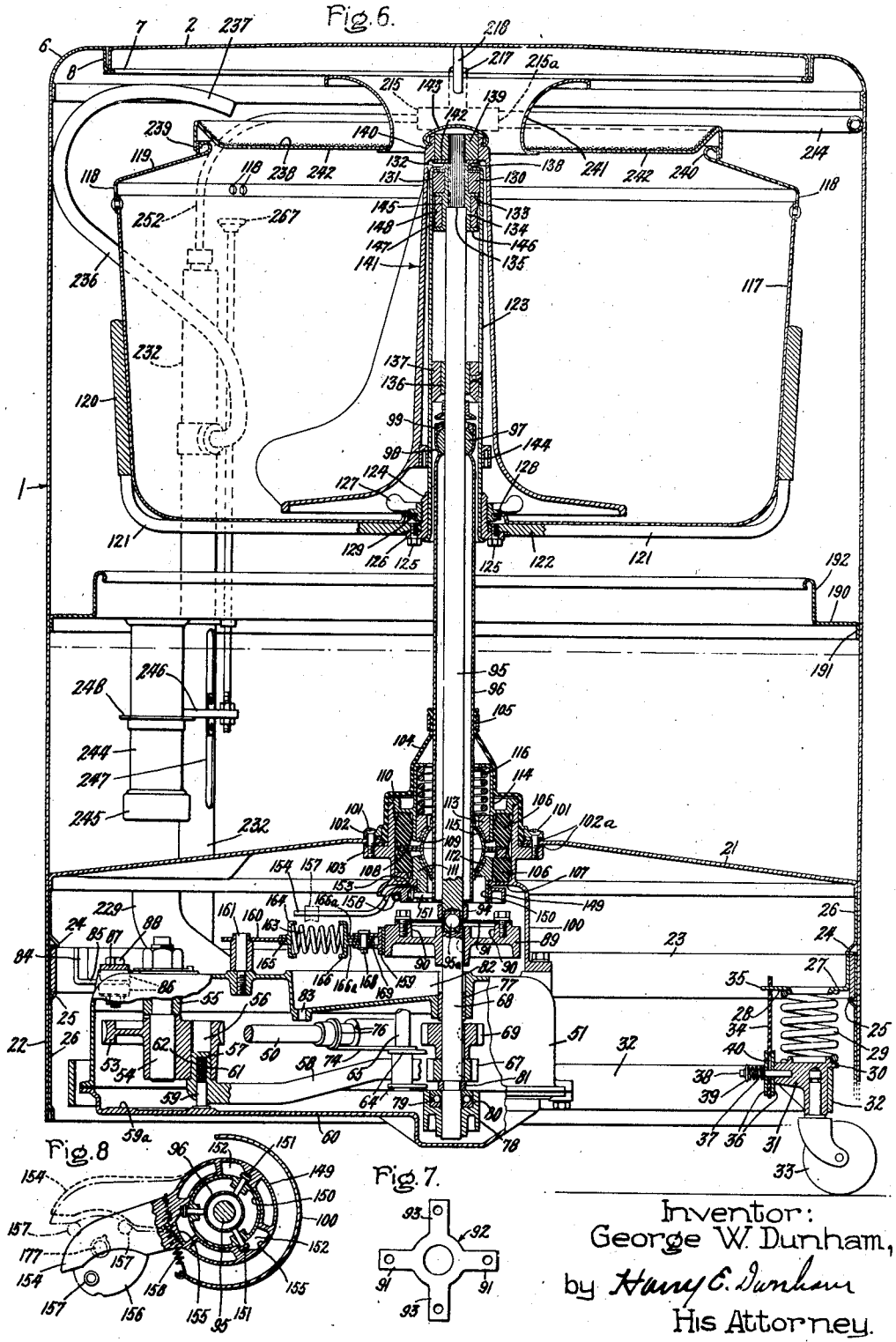

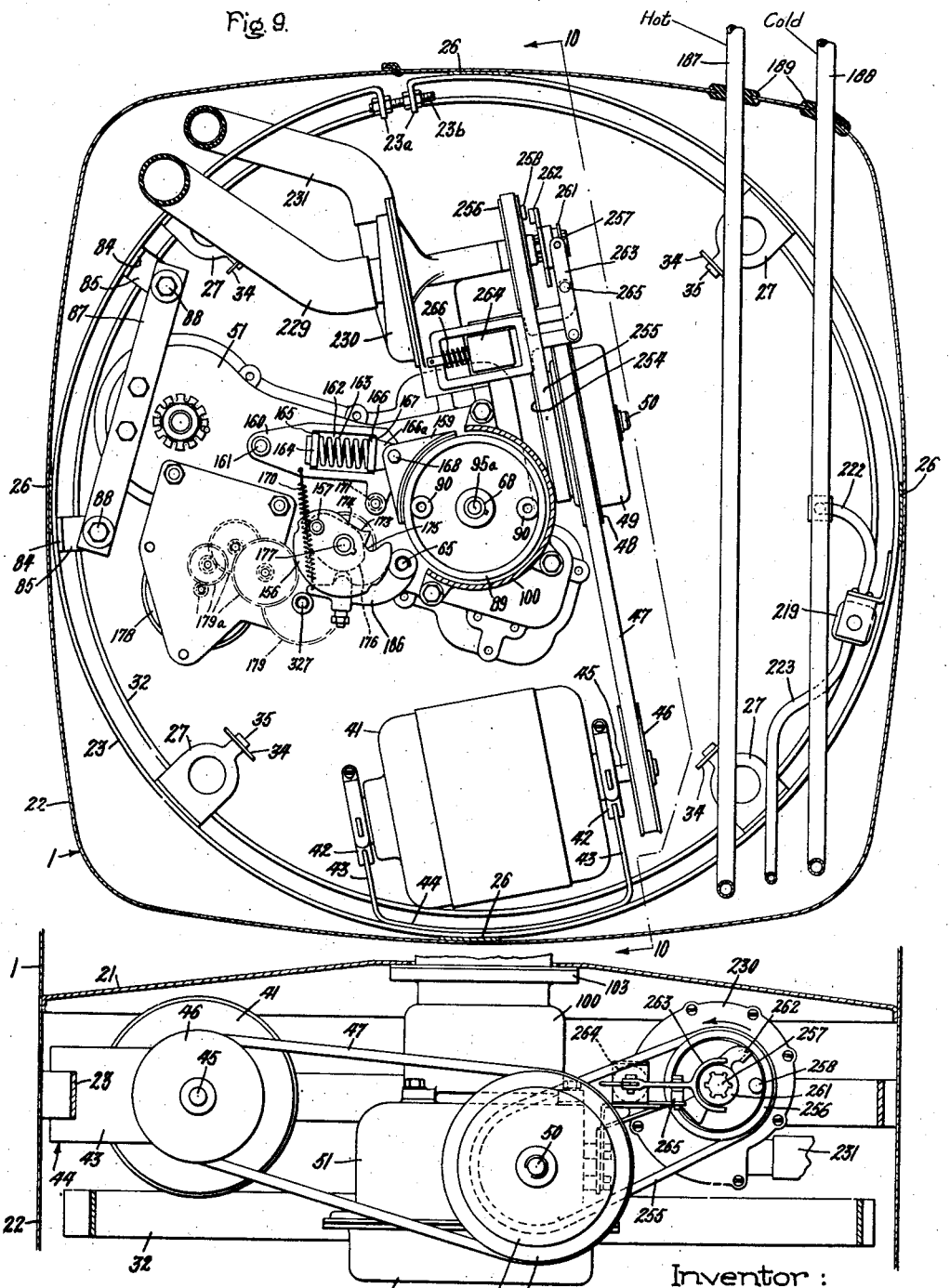

Oct. 6, 1942.   G. W. DUNHAM   2,297,694
WASHING MACHINE
Filed March 25, 1939   10 Sheets-Sheet 5

Inventor:
George W. Dunham,
by Harry E. Dunham
His Attorney.

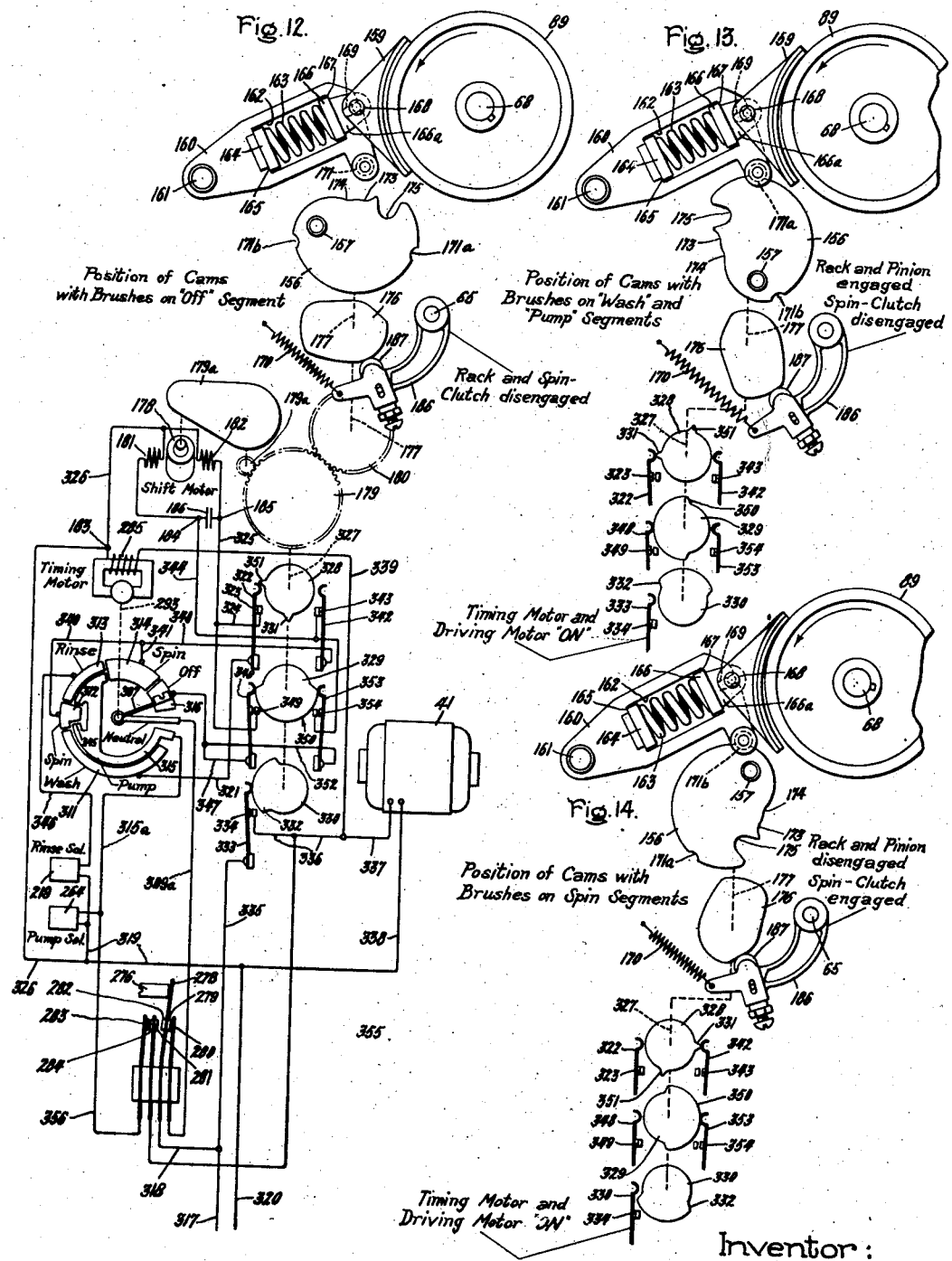

Oct. 6, 1942.                G. W. DUNHAM                2,297,694
                            WASHING MACHINE
                         Filed March 25, 1939         10 Sheets-Sheet 7
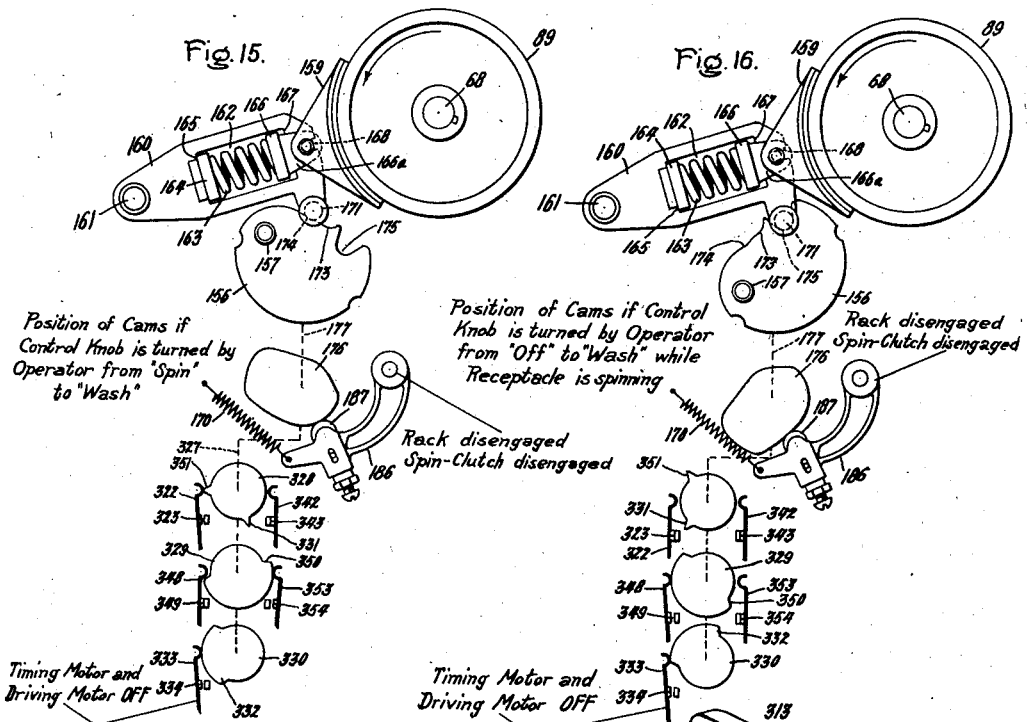
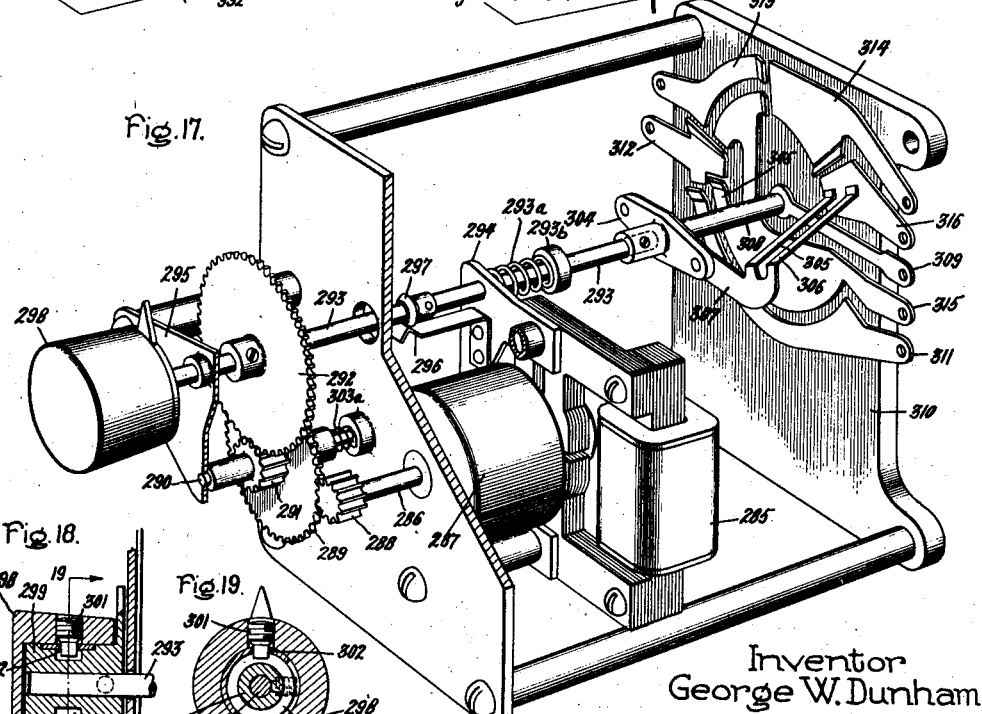
Inventor
George W. Dunham,
by Harry E. Dunham
His Attorney.

Oct. 6, 1942.  G. W. DUNHAM  2,297,694
WASHING MACHINE
Filed March 25, 1939  10 Sheets-Sheet 8
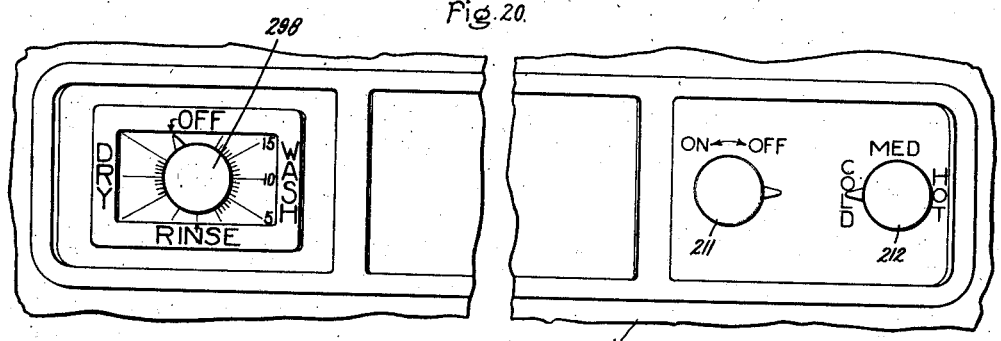
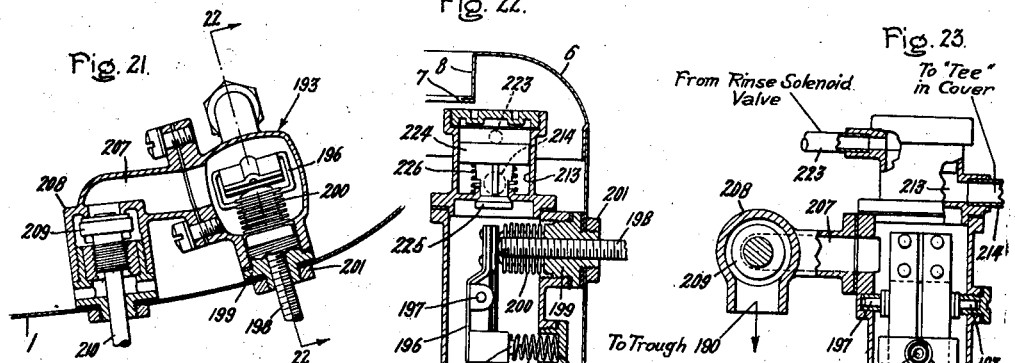
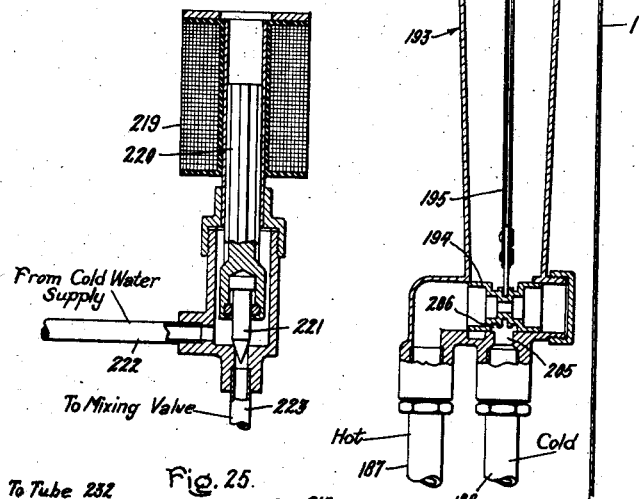
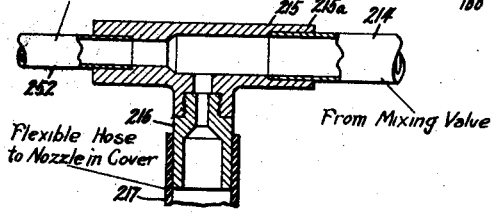
Inventor:
George W. Dunham,
by Harry E. Dunham
His Attorney.

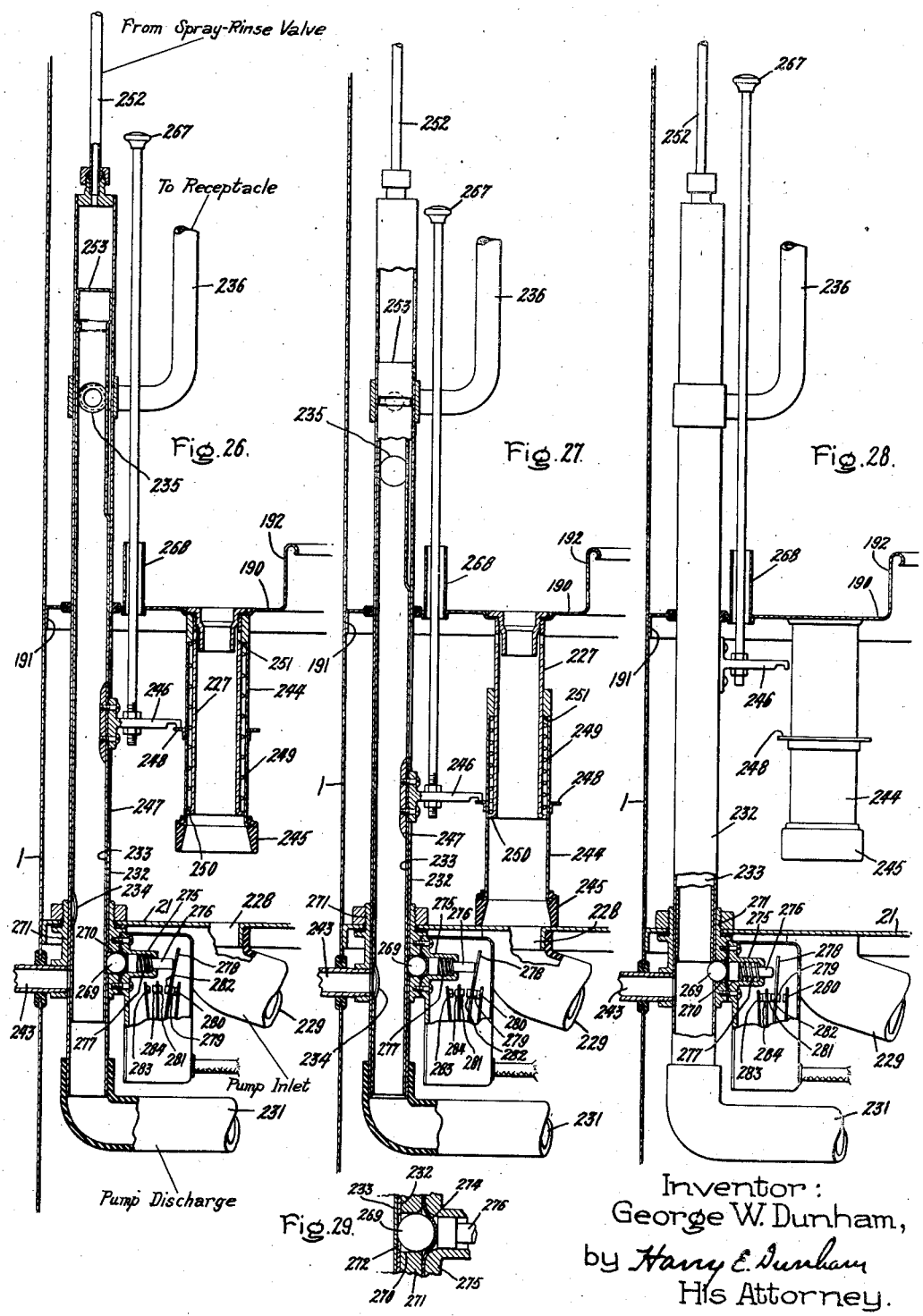

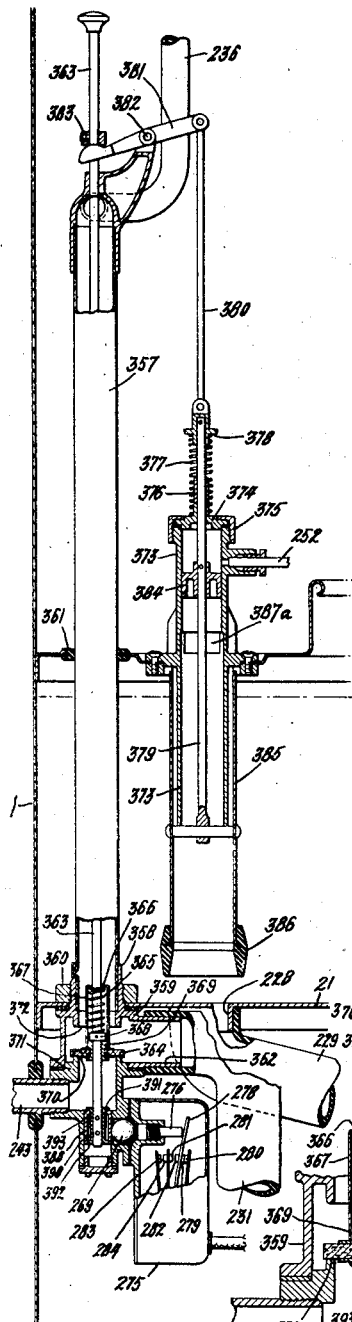

Patented Oct. 6, 1942

2,297,694

UNITED STATES PATENT OFFICE 2,297,694

WASHING MACHINE

George W. Dunham, Westport, Conn., assignor to General Electric Company, a corporation of New York Application March 25, 1939, Serial No. 264,156

8 Claims. (Cl. 68—12)

The present invention relates to washing machines of the type in which the clothes are washed, rinsed, and dried in a single receptacle or compartment.

The object of my invention is to provide an improved construction and arrangement in washing machines of this type, and for a consideration of what I believe to be novel and my invention, attention is directed to the following description and the claims appended thereto.

Figure 1:
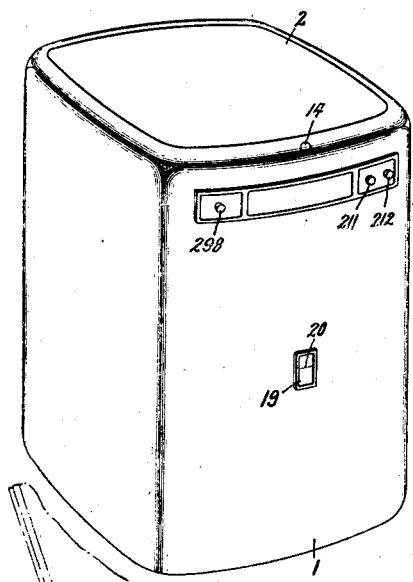
Figure 2:
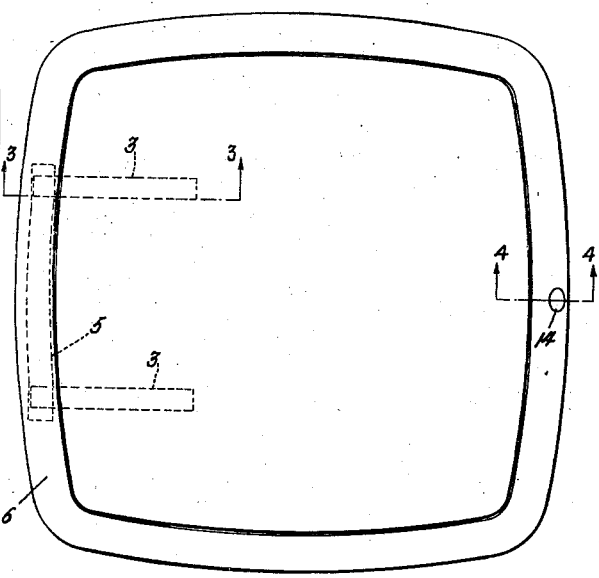
Figure 3:
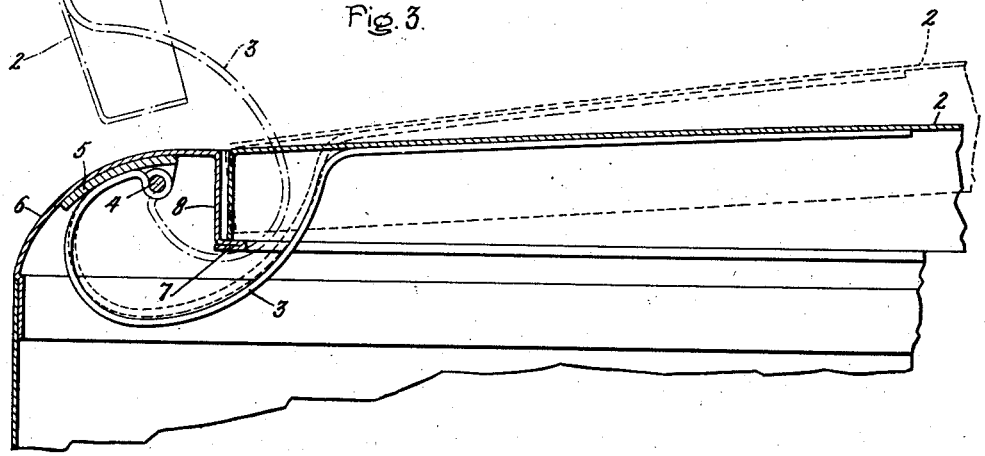
Figure 4:
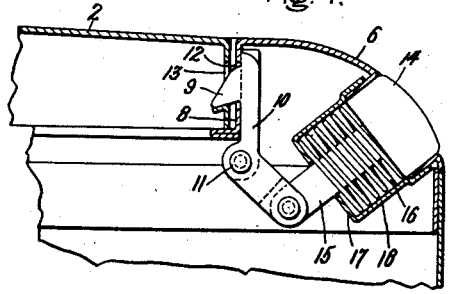
Figure 5:
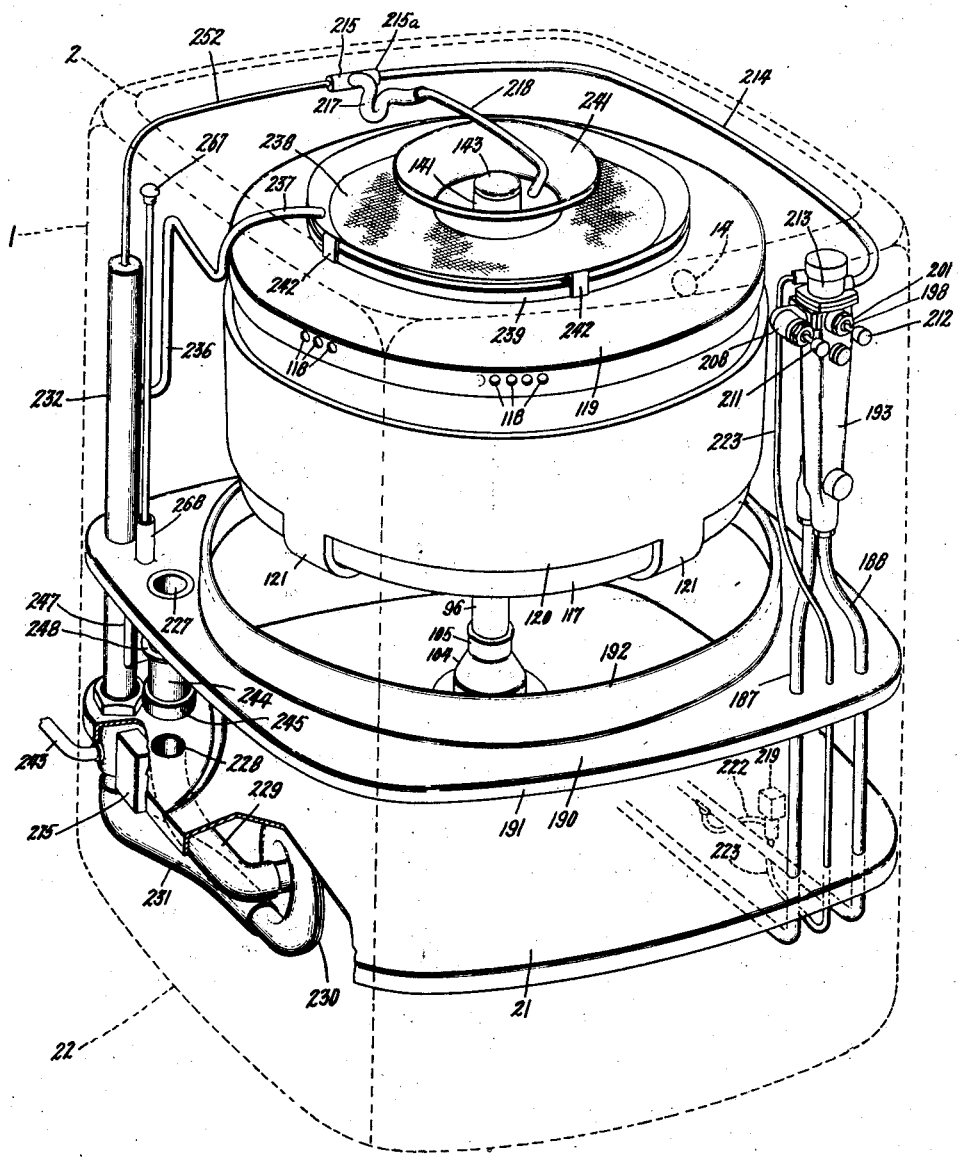
Figures 11, 34:
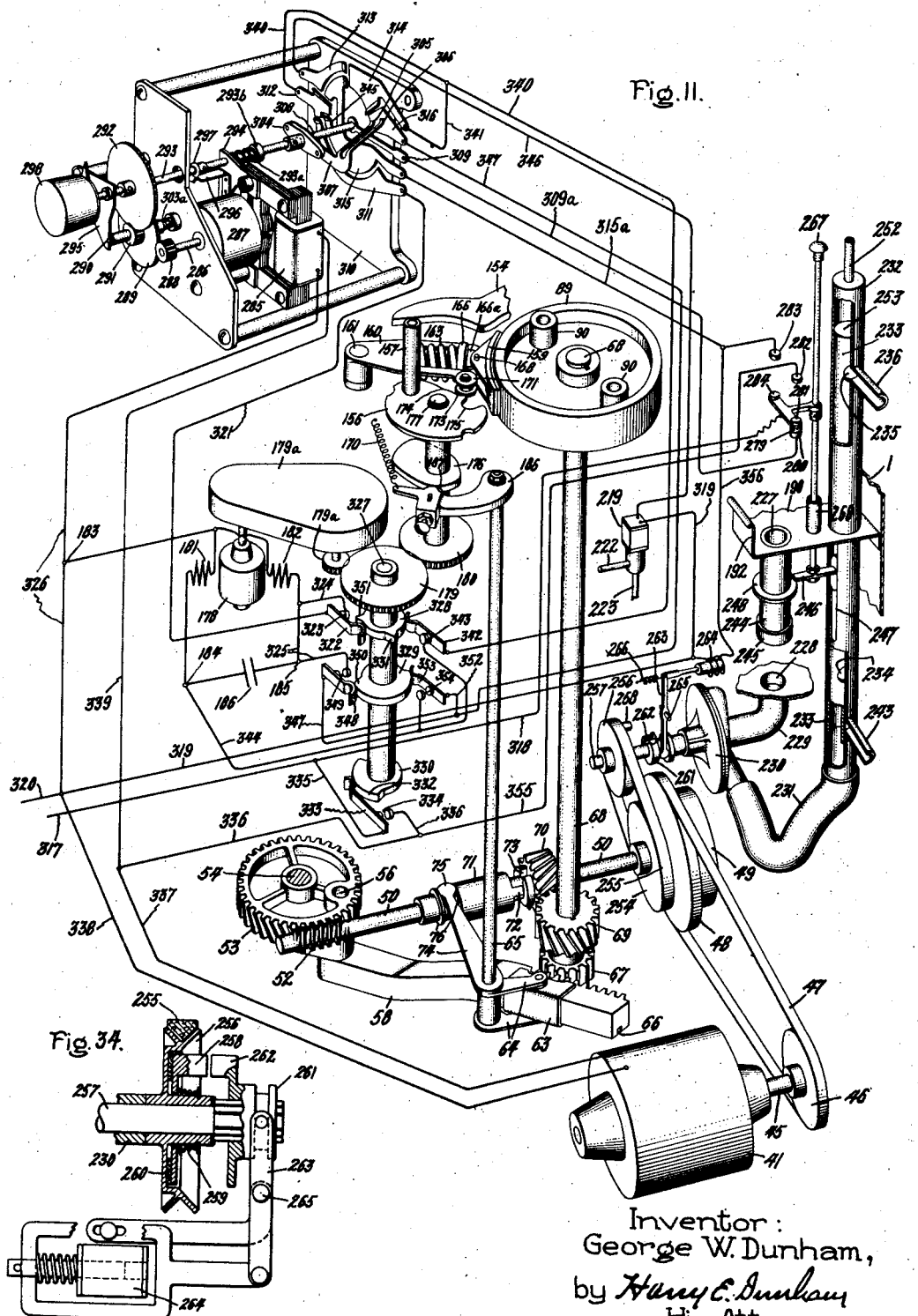

In the accompanying drawings, Fig. 1 is a perspective view of a washing machine embodying my invention; Fig. 2 is a top plan view; Fig. 3 is a sectional view showing one of the cover hinges, taken on line 3—3 of Fig. 2; Fig. 4 is a sectional view of the cover latch taken on line 4—4 of Fig. 2; Fig. 5 is a perspective view of the washing machine, the outer casing and a part of the casing bottom being broken away; Fig. 6 is a sectional elevation of the washing machine; Fig. 7 is a top plan view of the universal joint connecting the driving mechanism to the operating shaft; Fig. 8 is a top plan view of the construction for centering or stabilizing the washing compartment or receptacle during washing; Fig. 9 is a top plan view of the operating mechanism; Fig. 10 is a sectional view taken on line 10—10 of Fig. 9; Fig. 11 is an exploded view of the operating mechanism and the control therefor; Fig. 12 is a diagrammatic view showing the position of the control in the neutral or "off" position; Fig. 13 is a diagrammatic view showing the position of the control in the washing position; Fig. 14 is a diagrammatic view of the control in the drying position; Fig. 15 is a diagrammatic view showing the position of the control when the control knob is turned manually from the drying position back to the washing position; Fig. 16 is a diagrammatic view showing the position of the control when the control knob is manually turned from the neutral or off position to the washing position before the rotation of the washing compartment has stopped; Fig. 17 is a perspective view of the timing control; Fig. 18 is a sectional view through the control knob; Fig. 19 is a sectional view taken on line 19—19 of Fig. 18; Fig. 20 is a front view of the escutcheon plate and control knobs; Fig. 21 is a sectional top plan view of the water supply valves; Fig. 22 is a sectional elevation of the thermostatic mixing valve taken on line 22—22 of Fig. 21; Fig. 23 is an elevation, partly in section, of the mixing and water supply valves, the view being taken at right angles to line 22—22 of Fig. 21; Fig. 24 is a sectional elevation of the solenoid controlling the supply of rinsing water; Fig. 25 is a sectional view of the T fitting distributing the rinsing water; Fig. 26 is a sectional elevation of the water circulating system, the parts being shown in the washing position; Fig. 27 is a similar view showing the parts in the rinsing position; Fig. 28 is a similar view, the parts being in the tub emptying position; Fig. 29 is a sectional elevation of a control member for the tank emptying switch; Fig. 30 is a sectional elevation of a modification of the water circulating system, the parts being shown in the washing position; Fig. 31 is a similar view, the parts being in the rinsing position; Fig. 32 is a similar view, the parts being in the tub emptying position; Fig. 33 is a sectional view of the drain valve structure and associated parts; and Fig. 34 is a sectional elevation of the pump drive and control.

Referring to the drawings, there is shown a washing machine having an outer casing 1 the open top of which is closed by a cover 2. The cover is supported by resilient leaf hinge arms 3 on hinge pins 4 caried by a hinge plate 5 fixed to the underside of the casing rim 6. As shown in broken lines in Fig. 3, the opening of the cover is limited by engagement of the hinge arms 3 with the lower edge 7 of a flange 8 on the casing rim 6. The cover is held in the closed position by a latch 9 on one end of a bell crank lever 10 pivoted on a pin 11 fixed to the flange 8. The latch projects through an opening 12 in the flange into an opening 13 in the edge of the cover. The latch is released by downward pressure on a push button 14 integral with a plunger 15 pivotally connected to the other end of the bell crank lever 10. The outer end of the push button 14 is normally flush with the rim 6 of the casing. The latch is held in the engaged position by a coil spring 16 arranged between the underside of the push button 14 and an inwardly extending flange 17 on a sleeve 18 secured to the casing. When the cover is in the closed position the spring arms 3 are slightly stressed. Upon release of the latch the cover is raised by the spring arms to the dotted line position of Fig. 3. In this position the front edge of the cover is raised so that it may be conveniently grasped by the operator. The upper edge of the latch 9 is inclined so that the cover may be closed by merely exerting a downward pressure on the front edge of the cover.

In the front wall of the casing is a window 19 through which the operator may observe the water level in the casing. The window carries an appropriate indicating line 20 to indicate the proper water level.

The lower end of the casing is closed by a bottom wall 21 below which the side walls of the casing extend to provide a depending skirt 22. Within the skirt is a cylindrical ring 23 which is supported on the skirt between shoulders 24 and 25 on bracing members 26 fixed to the skirt at four equally spaced points. Since the skirt and the casing side walls are roughly square and the supporting ring 23 is circular, the braces 26 are located midway between each of the casing side walls at the points of tangency of the ring to the casing side walls. For convenience in installation the ring 23 is split and provided with inwardly bent flanges 23a (Fig. 9) through which extends a threaded stud 23b. By means of nuts threaded on the stud 23b on opposite sides of the flanges 23a it is possible to contract the ring 23 so as to permit easy insertion and, after insertion, to expand the ring into tight engagement with the side walls of the casing. Fixed on the ring 23 midway between each of the braces 26 are brackets 27 in the underside of each of which is formed a spring seat 28. A top view of the brackets is shown in Fig. 9. For convenience one of the brackets is shown at the right lower end in Fig. 6 opposite one of the braces 26. The illustration in Fig. 6 is for convenience, the true location of the brackets 28 being midway between the braces 26. The weight of the casing is carried on coil springs 29 arranged between the seats 28 and seats 30 in caster brackets 31. The caster brackets are braced by a stiffening ring 32 encircling the caster brackets and fixed thereto. With this construction the weight of the casing is resiliently supported on the coil springs 29. Suitable casters 33 are mounted in the caster brackets.

The springs 29 permit the casing to vibrate independently of the casters so that vibration is not transmitted from the machine to the floor. In the case of small amplitude vibrations it is desirable that the machine be permitted to freely vibrate on the springs 29. In the case of large amplitude vibrations it is desirable that friction damping means be provided to limit the amplitude. This is effected by means of friction strips 34 having their upper ends hooked over ears 35 on the brackets 27 and having their lower ends extending between spring pressed washers 36. The washers 36 are pressed together and against caster brackets by means of coil springs 37 arranged around pins 38 fixed in the caster brackets and between the washers 36 and washers 39 fixed on the pins 38. The friction strip 34 has an elongated slot 40 therein which surrounds the pin 38. This slot permits the friction strip to move vertically between the washers so that the deflection of the springs 29 due to the weight supported thereby does not interfere with the friction damping. In effect this pin and slot connection provides a floating connection between the friction strip 34 and the friction damping washers 36. When the machine is lifted off the floor the bottom walls of the slots 40 engage the pins 38 and limit the expansion of the springs 29 and hold the springs between the spring seats. The ears 35 have a loose fit in the friction strips 34, providing a lost motion connection to the friction strips. With such an arrangement the friction strips come into action only on vibrations of greater amplitude than the lost motion provided by this connection.

The machine is driven by an electric motor 41 resiliently supported in rubber rings 42 (Fig. 9) clamped to the inwardly extending ends 43 of a base 44 fixed to the supporting ring 23. On the motor shaft 45 is fixed a pulley 46 over which runs a belt 47. The belt 47 drives a pulley 48 which is connected through a friction clutch 49 to a shaft 50 journaled in a gear casing 51. Since friction clutches are well known in the art, the details of the friction clutch 49 need not be illustrated for the purposes of the present invention.

As shown in Fig. 11, the shaft 50 has cut thereon a worm 52 meshing with a worm wheel 53 rotatably carried on a stub shaft 54 fixed in a boss 55 on the top wall of the gear casing. The worm wheel is provided with a socket 56 for receiving the crank pin 57 of a rack 58. The crank pin is held in the socket by means of a pin 59 having its lower end bearing on a circular raised portion 59a on the cover plate 60 of the gear casing and having its upper end bearing on a coil spring 61 arranged in a socket 62 in the crank pin. The pin 59 holds the rack against the lower edge of the worm wheel 53 and thereby holds the worm wheel on its shaft 54. The friction between the pin 59 and the cover plate tends to prevent over-travel or back-lash in the gearing. The rack is slidably carried in a guide 63 pivoted between forked arms 64 fixed to a rock shaft 65 journaled in the top wall of the gear casing. The underside of the guide 63 has a tongue (not shown) which slidably fits in a longitudinal slot 66 in the underside of the rack.

By turning the rock shaft 65 the rack is moved into and out of engagement with a pinion 67 keyed to a shaft 68. By this means it is possible to selectively oscillate the shaft 68 through an angle which depends upon the number of teeth on the pinion 67 and the eccentricity of the socket 56 in the worm wheel. Also keyed on the shaft 68 is a pinion 69 which meshes with a pinion 70 (Fig. 11) loose on the continuously driven shaft 50. The driving connection from the shaft 50 to the pinion 70 is effected by means of a clutch member 71 splined on the shaft 50 and having clutch teeth 72 cooperating with notches 73 in the pinion 70. When the clutch teeth 72 are moved into engagement with the notches 73 the shaft 68 is continuously rotated through the pinions 69 and 70 at a speed substantially equal to the speed of shaft 50.

The engagement of the clutch teeth 72 is controlled by an arm 74 fixed on the rock shaft 65 and having a rounded end 75 bearing in an annular groove between shoulders 76 on the clutch 71.

In Fig. 11 the arms 64 and 74 are shown in the neutral position in which both the clutch 71 and the rack 58 are disengaged. Upon counterclockwise movement of the shaft 65 the rack is moved into engagement with the pinion 67 to establish the oscillating driving connection to the shaft 68. Upon clockwise movement of the shaft 65 the clutch 71 is moved into engagement with the pinion 70 to establish a high speed rotating driving connection to the shaft 68.

The shaft 68 is journaled at its upper end in a sleeve bearing 77 (Fig. 6), in the top wall of the gear casing and at its lower end in a strut 78 extending across and fixed at each end to the side walls of the gear casing. The shaft is supported in the strut 78 by a ball thrust bearing 79 arranged in a socket 80 in the top wall of the strut.

The thrust is transmitted to the bearing by a collar 81 on the shaft.

During oscillation of the shaft 68, lubricant may be pumped up between the shaft and the sleeve bearing 77. This lubricant flows from the upper end of the bearing 77 into a well 82 in the top wall of the gear casing which has a drain opening 83 for returning the lubricant to the gear casing. The walls of the well are in the form of a hollow stiffening rib for the gear casing.

The gear casing is supported (Figs. 6 and 9) from the supporting ring 23 by brackets 84 fixed to the supporting ring and having ears 85 extending between annular rubber bushings 86. A supporting arm 87 fixed to the top of the gear casing has its ends resting on the upper bushings. The parts are held in assembled relation by bolts 88 extending through the ends of the arm 87 and the bushings 86 and clamping the bushings against the supporting ears 85. This arrangement provides a resilient support for the gear casing. The resilience can be adjusted by varying the clamping pressure of the bolts 88.

In the above-described gear case construction the driving parts except rack 58 are all carried by the top and side walls of the gear casing, and the cover plate 60 provides a bottom closure and supports rack 58 through pin 59 and spring 61. Due to this construction the gear case may be repaired and adjusted without disassembling the machine. It is necessary merely to tip the machine upside down and remove the cover plate 60, thus leaving all of the operating parts exposed. The opening 83 in the well 82 is so located that it is above the lubricant level in the gear casing in all positions.

Keyed to the shaft 68 is a brake drum 89 having diametrically opposed bosses 90 to which are bolted arms 91 of a universal joint 92. The arms 93 of the universal joint are bolted to opposite ends (not shown) of an arm 94 (Fig. 6) fixed to the lower end of a vertical shaft 95. The gravity thrust of the vertical shaft 95 is transmitted to the shaft 68 through a thrust ball 95a arranged between bearings in the respective shaft ends (Fig. 6). With this arrangement the universal joint does not have to withstand any of the gravity thrust, and the friction of the universal joint, which tends to cause shaft whip or in other words forward precession of the shaft, is decreased. It is possible to use a simple universal joint of the type shown, which may consist merely of a piece of sheet steel provided with two pairs of arms which are connected respectively to the driving and driven shafts. The arms of the universal joint are sufficiently flexible so that the vertical shaft 95 may have a gyratory movement with respect to the driving shaft 68. The friction in the universal joint is further decreased by the use of metal which has low internal friction compared to fabric.

The vertical shaft 95 extends through a sleeve 96, the upper end of which is above the normal water level in the outer casing or stationary tub 1. The upper end of the sleeve is provided with a spherical seat for a self-lubricating bearing 97 which guides the shaft 95. This spherical seat comprises a flared portion 98 of the sleeve and a collar 99 which is secured in the upper end of the sleeve. The spherical seat permits alignment of the bearing 97 with the shaft 95, so that the bearing pressure is uniform regardless of the inclination of the shaft.

The gear casing 51 which houses the driving mechanism has fixed thereto a hollow post 100 which projects up through a central opening in the bottom wall 21 of the casing 1. The post 100 is secured to the bottom wall of the tub by means of screws 101 which are threaded through a clamping ring 102 into tapped holes in flange 103 on the post. Leakage from the bottom of the tub is prevented by means of a rubber washer 102a between the tub bottom 21 and the flange 103 and by a rubber sleeve 104 which has its lower edge clamped between the clamping ring 102 and the bottom of the tub and has its upper edge clamped to the sleeve 96 by means of a clamp 105.

Within the post 100 is a resilient mounting for the lower end of the sleeve 96 which comprises two cushioning rings 106 of rubber or other resilient material. The lower ring is arranged between an inwardly extending flange 107 at the lower end of the post and a flange 108 projecting from a spherical member 109 fixed to the sleeve 96. The upper ring 106 is arranged between the upper side of the flange 108 and a nut 110 threaded into the upper end of the post 100. The nut 110 varies the compression of the rubber and thereby varies the stiffness of the mounting. With this mounting the sleeve 96 is resiliently held in a central position and is free to tilt in all directions in order that the shaft 95 may have a gyratory movement about the driving shaft 68. This means that the gear casing with its relatively heavy mechanism does not have to undergo a forced vibration due to gyration of the shaft 95.

The gyratory movement of the shaft 95 is damped by friction members bearing on the spherical member 109. The lower friction member comprises a ring 111 seated on the inner edge of the flange 107. The outer edge of the ring 111 bears against the inner edge of the lower cushioning ring 106, and the inner edge of the ring 111 is provided with a spherical seat carrying friction material 112 which bears on the spherical member 109. The upper friction member comprises a ring 113 slidably carried in a sleeve 114 integral with the nut 110. The ring 113 likewise has a spherical seat carrying friction material 115 which bears on the upper side of the spherical member 109. The outer edge of the sleeve 114 bears against the inner edge of the upper cushioning ring 106. The pressure between the friction material 112 and 115 and the spherical surface of member 109 is created by a coil spring 116 which presses against the upper edge of the ring 113. Since the ring 113 is slidable in the sleeve 114 the pressure on the spring 116 is not transmitted to the rubber rings 106 and therefore does not affect the resilient mounting for the sleeve 96. Also, the pressure exerted on the friction material is not affected by the inclination of the shaft 95.

The above-described construction for cushioning and damping vibrations is being claimed in my application Serial No. 92,373, filed July 24, 1936.

In the upper part of the stationary tub is a rotatable tub or receptacle 117 for receiving liquid and material to be washed. The space between the bottom of the receptacle and the bottom wall 21 of the casing is sufficient to provide a storage space for all the liquid which can be placed in the receptacle. The receptacle is made of relatively thin and non-corrosive metal, such as aluminum, so that it is quite light. The side walls of the receptacle are imperforate and are tapered so that, as the receptacle is rotated, liquid will be discharged through openings 118 in its upper edge. At the upper edge of the receptacle above the openings 118 is an annular guard ring 119 which keeps the clothes within the receptacle during washing and extracting.

The receptacle is supported on a combined carrier and balance ring having annular reinforcing walls 120 surrounding the side walls of the receptacle and having spaced radial arms 121 connecting the walls 120 to a disk 122 to which is secured a hub 123. For securing the receptacle hub 123 to the disk 122, a sleeve 124 is suitably fixed to the lower end of the hub, and screws 125 are threaded through a flange 126 on the sleeve into tapped holes in the underside of the disk. The receptacle is secured to the carrier by means of a wing nut 127 threaded on the sleeve 124 which engages a flange 128 on the receptacle. The nut is provided with a flange 129 which extends underneath the flange 128. The purpose of the flange 129 is to lift the receptacle from the carrier when the nut is unthreaded. This insures the easy release of the receptacle from the carrier.

With this construction the carrier is not subject to the corrosive action of the washing solution and can therefore be made of a relatively cheap material, such as galvanized steel or cast iron, while the receptacle, which must be made of relatively expensive non-corrosive material, can be very light. The receptacle can therefore be easily removed for cleaning. Another advantage of this construction is that the spacing of the arms 121 to the carrier is sufficient to permit easy access to the bottom and side walls of the outer casing when the receptacle 117 is removed. This facilitates the cleaning of the casing. Another advantage of this construction is that the annular reinforcing walls 120, which are relatively heavy, increase the mass of the receptacle and thereby serve as a balance ring which diminishes the amplitude of gyration due to unbalanced distribution of load within the receptacle. The balance ring need not be removed when the casing is cleaned.

The carrier is supported on the upper end of the vertical shaft 95 by a combined sleeve and thrust bearing 130 which is held in the upper end of the hub 123 by a washer 131 arranged between the bearing and a spun-over portion 132 of the hub. The lower edge of the bearing 130 bears on a flange 133 on a sleeve 134 which is splined on the shaft 95. The inner surface of the bearing 130 bears on the sleeve 134. The weight of the carrier and receptacle is transmitted from the bearing 130 through the flange 133 to a shoulder 135 on the shaft 95, and from the shaft 95 through the thrust ball 95a to the shaft 68 which has a thrust bearing 79 immersed in the lubricant in the gear casing. The lower end of the hub 123 is guided on the shaft 95 by a sleeve bearing 136 fixed in a sleeve 137 secured to the inside of the hub. With this arrangement the carrier and receptacle are rotatably supported on the shaft 95, and the shaft 95 is normally free to rotate relative to the hub 123. When the carrier is removed from the shaft 95, a snap ring 138 on the sleeve 134 above the washer 131 holds the sleeve 134 and the parts assembled thereon in fixed relation to the hub 123, so that these parts are removed as a unit. This allows the bearing 136 to be of minimum diameter, thereby reducing the friction loss, and permits the whole carrier assembly to be lifted off the shaft 95 without disturbing any of the parts.

The splined end of the shaft 95 projects above the sleeve 134 and has a nut 139 splined thereon which fits within a complementary socket 140 in the hub of an agitator 141, providing a positive driving connection for the agitator. The weight of the agitator is carried on the upper end of the sleeve 134 through a thrust washer 142. The upper ends of the hub 123 and the agitator extend above the normal water level in the receptacle, but, during washing, water is sometimes splashed over the upper end of the agitator. Leakage of this water around the shaft 95 is prevented by a cap 143 secured over the upper end of the agitator. The lower end of the agitator is guided on the hub 123 by a bearing 144 fixed in the agitator.

The arrangement for connecting the shaft 95 to the receptacle during extracting is the same as that shown in my application Serial No. 61,635, filed January 31, 1936. In accordance with this arrangement the lower end of the sleeve 134 is provided with a squared portion 145 between the flange 133 and a flange 146. Between these flanges are clutch shoes 147 which are held against diametrically opposite corners of the squared surface by a resilient split ring 148 when the shaft 95 is oscillated at the required speed for washing. Therefore, during this oscillation of the shaft the receptacle will not be connected to the shaft and the agitator will oscillate in the receptacle. When the clothes are to be dried the shaft 95 is rotated at high speed. As soon as the speed of rotation exceeds a few hundred R. P. M., the centrifugal force acting on the clutch shoes 147 overcomes the contractive force of the resilient ring 148 and causes the shoes to be thrown outward. When the shoes make contact with the inner surface of the hub 123 the friction between the shoes and the hub causes the shoes to be displaced relative to the squared cam surface 145. This displacement causes the shoes to be wedged between the squared cam surface and the inner surface of the hub, thereby completing a positive driving connection between the shaft and the receptacle. Similarly, when stopping the rotation of the receptacle, for example, by applying a braking force to the brake drum 89, the shoes release and immediately wedge in the opposite direction. This driving connection is dependent upon the torque transmitted through the shaft 95, so that when the torque is removed the shoes may, by means of spring 148, be easily returned to their normal position against the squared cam surface 145.

Since the resilient mounting provided by the rubber rings 106 is preferably quite weak, the tilting of the receptacle 117 during washing may be sufficient to cause the receptacle to strike the side of the outer casing 1. Once in this position the receptacle will tend to remain there due to the shifting of the liquid and contents of the receptacle, and the friction between the receptacle and the casing and the resultant unbalance would greatly increase the power required for the subsequent rotation of the receptacle for centrifugal extracting. In the present construction this difficulty is avoided by holding the receptacle in a central position during washing, the holding device or stabilizer being released after washing and before starting to dry. The receptacle will then remain in a substantially upright position due to the friction between the spherical member 109 and the friction material 112 and 115 and to the absence of external forces tending to tilt the receptacle such as produced by the washing means.

One arrangement for accomplishing this result comprises a collar 149 (Figs. 6 and 8) pivoted on a sleeve 150 depending from the ring 111. Three pins 151, which are slidably carried in the sleeve 150, extend radially from the sleeve 96 into a groove 152 in the collar 149. The pins 151 support the collar by engaging a flange 153 on the collar. When the collar is in the position shown in full lines in Fig. 8, there is no clearance between the pins 151, the sleeve 96, and the groove 152, and the sleeve 96 is accordingly held or centered in a vertical position, thus preventing tilting of the receptacle during washing. During extracting, the collar 149 is turned by lever 154 to the position shown in dotted lines in Fig. 8. In this position, depressions 155 in the groove 152 provide sufficient clearance to permit inclination of the sleeve 96. The same condition obtains when the washing machine is in the "off" or neutral position shown by broken lines. The lever 154 is moved by rotation of a cam 156 (Fig. 11) having an arm 157 toward which the lever is urged by a tension spring 158 arranged between the arm 154 and the post 100.

At the conclusion of the washing operation, the driving mechanism is adjusted so that the shaft 95 is rotated continuously in one direction. As soon as the speed of rotation of the shaft is such that the centrifugal force of the clutch shoes 147 exceeds that of the retaining spring 148, the clutch shoes move outwardly under the action of centrifugal force and touch the inner surface of the hub 123 and are wedged against the inner surface of the hub to establish a driving connection to the receptacle.

Since the clothes may be non-uniformly distributed in the receptacle, the receptacle may be unbalanced. This unbalance will usually consist partially of a static unbalance, which is equivalent to a single weight displaced from the axis of rotation of the receptacle, and partially of dynamic unbalance, which is equivalent to the couple produced by vertically spaced weights of equal size located on opposite sides of and equidistant from the axis of rotation of the receptacle. The static unbalance will tend to cause gyration of the receptacle about its axis so that the receptacle rotates about its center of mass. The dynamic unbalance will tend to cause tilting of the receptacle so as to bring the receptacle into a position in which there is no unbalanced couple. The resilient mounting provided for the lower end of the sleeve 96 permits gyration of the receptacle about its axis so that the receptacle rotates about its center of mass, neutralizing the effect of static unbalance. Since the resilient mounting has some stiffness, the gyration of the receptacle about its axis is not sufficient to permit the receptacle to rotate about its center of mass, but the resilient mounting does permit sufficient gyration of the receptacle to approximate that position so that the vibration due to static unbalance is considerably decreased. Since the sleeve bearings 130 and 136 prevent tilting of the receptacle with respect to the shaft 95, the receptacle will cause vibration due to the dynamic unbalance. This tendency of the receptacle to tilt causes heavy bearing pressure on the bearings 130 and 136 but, since there is no relative rotation between the bearing surfaces of these bearings, this pressure causes no bearing loss. Most of the force due to the dynamic unbalance of the receptacle will be transmitted through the universal joint at the lower end of the shaft 95 to the shaft 68. This force is taken by the bearings 77 and 79 in which the shaft 68 rotates. Since the bearings for the shaft 68 are a considerable distance from the receptacle 117, the force on the bearings due to the unbalanced couple is less than it would be at a point nearer the receptacle. This means that the bearing loss due to the unbalanced couple is decreased. Also, these bearings are located outside the outer casing and are therefore not subjected to the humid atmosphere within the casing and are more easily lubricated. Some of the force due to the dynamic unbalance or unbalanced couple is transmitted to the sleeve 96. However, since this sleeve is resiliently supported, these vibrations are cushioned. The cushioning action decreases the bearing pressure on the bearing 97 and thereby decreases the bearing loss.

During the rotation of the receptacle, vibrations are transmitted from the receptacle through the universal joint and the sleeve 96 to the supporting ring 23. Some of the vibrations are shaft frequency vibrations due to unbalance. These vibrations are particularly great when the speed of the shaft is such that the vibrations are resonant with the natural frequency of the mounting provided by the rubber rings 106. This vibration may be termed the critical vibration of the machine due to this mounting, and the speed at which this vibration occurs may be called the mounting critical speed. It is desirable that the speed at which this vibration takes place be substantially below the normal operating speed, for example less than one-sixth of normal speed, so that the centrifugal forces due to unbalance which are proportional to the square of the speed will be relatively small and the reaction on the bearings will not produce so much friction that the receptacle cannot be driven through the critical speed. In the machine illustrated, the mounting critical speed is approximately the "water emptying speed" of the receptacle, i. e., the speed at which the water is first uniformly centrifugally discharged through the openings 118. On reaching this speed an annular sheet of water is discharged from the openings 118 against the casing side walls. The friction drag of the water acts as a "water brake" which holds the receptacle at this speed until the free water (the water not absorbed in the clothes) is discharged. This makes it easier to accelerate the receptacle through the critical speed.

In addition to these vibrations, there may be gyroscopic vibrations which result in precession of the receptacle. Precession is a rotation of the axis of rotation of the receptacle and may be forward or backward with respect to the direction of the shaft rotation. Backward precession is due to the restoring force provided by the rubber rings 106. Forward precession may be due to internal friction in the rotating parts, such as internal friction in the shaft 95 and friction in the universal joint 92. Forward precession may also result from unbalanced application of the driving force. Since the forward precession tends to damp out backward precession, it is usually the more troublesome. Forward precession is sometimes known as "shaft whip." Both forward and backward precession are damped out by the "stationary" or "non-rotating" damping provided by the friction between the spherical surface of member 109 and the friction material 112 and 115 and by the internal friction in the rubber rings 106. The forward precession will not build up if the stationary damping force is equal or greater than the force exciting the forward precession. One important characteristic of this damper is that it has no lost motion. If lost motion is present the precession builds up to such a large amplitude that a great deal more damping is required to damp it out. Another characteristic of the damper is that the damping is symmetrical with respect to the axis of the shaft 95 and is independent of inclination of the shaft 95. The frequency of precession is of the same order as the mounting critical frequency due to the mounting provided by the rubber rings 106. As the shaft speed increases above the critical speed the frequency of the forward precession increases slightly and the frequency of the backward precession decreases slightly, both changes being substantially in proportion to the change in speed. The gyroscopic vibrations may be of large amplitude. The gyroscopic vibrations always occur at shaft speeds above the mounting critical speed. Due to the time required for the gyroscopic vibrations to build up, the gyroscopic vibrations are usually important only near the normal running speed.

At normal running speed, the transmission to the floor of vibrations due to unbalance may be decreased by means of a resilient support between the floor and the machine. However, a resilient support which will decrease the transmission to the floor of the vibrations due to unbalance at normal running speed is relatively ineffective to decrease the amplitude of the larger amplitude vibrations due to the mounting critical speed or to gyroscopic vibrations. These large amplitude vibrations may be of such magnitude as to cause the receptacle to strike against the tub and damage the machine. The reaction produced on the bearings by the critical vibrations due to the mounting may be sufficiently large to prevent bringing the receptacle up to its normal operating speed. It is therefore desirable that some means be provided for damping these large amplitude vibrations. This damping should be relatively ineffective for vibration of small amplitudes so that it will not increase the transmission of those vibrations.

A supporting arrangement which will decrease the transmission of the vibrations due to unbalance at normal running speed and which will damp the larger amplitude vibrations is provided by the springs 29 and the associated friction damper links 34. The lost motion between the links and the ears 35 makes the damping action effective only for large amplitude vibrations. The springs 29 are chosen so that the natural frequency of the machine on the springs does not correspond with any frequency of precession. This is important. It is generally preferable to have this natural frequency above the precession frequencies.

During the operation of the machine, the machine has a rocking vibration on the springs 29 which comprises horizontal and vertical components. Due to the connection between the ears 35 and the links 34, only the vertical component of vibration is damped. This is the principal component of vibration transmitted to the floor. It is important that the damping means be unaffected by the horizontal component of vibration since any resistance offered to horizontal vibration will produce a reaction which will increase the transmission of the vertical vibration. It is also important that the damping means be substantially unaffected by small amplitude vertical vibrations. Another characteristic of this damping arrangement is that it is not affected by the weight of the machine since the slots 40 in links 34 permit the links to assume a position which corresponds to the deflection of the springs 29 under the weight of the machine. When the weight of the machine is removed from the springs 29, for example during shipping, the links 34 hold the springs under tension so that they remain in place.

The rotation of the receptacle is retarded by means of a brake shoe 159 (Figs. 6, 9 and 11) which cooperates with the brake drum 89. The brake shoe is carried by an arm 160 pivoted on a stud 161 fixed to the top wall of the gear casing. The arm has a rectangular opening 162 receiving a coil compression spring 163 which is arranged between a seat 164, fixed to the edge 165 of the opening 162, and a seat 166 having forked arms 166a slidable on the edge 167 and connected thereto by a pin 168 fixed in the arms 166a and fitting in an elongated slot 169 in the arm 160. The pin 168 also serves as a pivot for the brake shoe 159. The clearance between the pin 168 and the slot 169 permits the brake shoe to move inward, compressing the spring 163. When the pressure is removed, the spring 163 pushes the seat 166 against the edge 167 of the arm 160. The spring is assembled under an initial compression which is approximately equal to the maximum brake pressure. With such an arrangement the brake pressure is substantially uniform.

The brake shoe is urged into engagement with the brake drum by a tension spring 170 (Fig. 9), and is held out of engagement with the brake drum by a roller 171 carried by the brake arm 160 which cooperates with the cam 156.

The operation of the brake is best described with reference to Figs. 12 to 16 inclusive. During washing, as shown in Fig. 13, the cam 156 holds the brake arm 160 in a position in which the brake shoe is clear of the brake drum. The same condition obtains during drying, as shown in Fig. 14. When the control is in the neutral position shown in Fig. 12, the cam 156 is moved to a position permitting the brake shoe to be moved by the spring 170 into contact with the brake drum. If the brake drum is rotating, as will be the case immediately after the centrifugal drying operation, the frictional torque exerted by the brake drum on the brake shoe will tend to turn the brake arm 160 in a clockwise direction, as viewed in Fig. 12, until the roller 171 comes into contact with a depression 173 in the cam. Under this condition the brake shoe pivot pin 168 will be slightly above a center line connecting the stud 161 and the shaft 68. Due to this relation of the pivot points the brake is applied with a toggle action, causing it to be quickly and positively moved against the brake drum. The braking pressure under this condition is limited by the compression of the spring 163. As soon as the rotation of the brake drum has stopped, the pressure exerted by the spring 163 tends to turn the brake drum in a counterclockwise direction, as viewed in Fig. 12, returning the brake shoe to the position illustrated in Fig. 12.

The brake will also be applied with a similar action when the cam 156 occupies the positions shown in Figs. 15 and 16. In the position shown in Fig. 15, the roller 171 rests in a depression 174. In the position shown in Fig. 16, the roller rests in a notch 175 which positively prevents further movement of the cam 172 until rotation of the brake drum has completely stopped. In Figs. 15 and 16 the brake shoe is shown in the position assumed while the brake drum is still rotating in a counterclockwise direction, as indicated. The spring 163 will move the brake shoe away from the drum as described above when rotation stops. If for any reason the roller 171 should stick in the notch 175, the roller will be forced therefrom by subsequent rotation of the cam 156 due to the slight inclination of the sides of the notches.

The brake control cam 156 and a cam 176 for controlling the driving mechanism are fixed on a cam shaft 177 journaled in the top wall of the gear casing. The cam shaft is rotated by a reversible electric motor 178 through a gear train 179, 179a which drives a gear 180 fixed to the lower end of the cam shaft 177. The "shift" motor 178 has reversing field windings 181 and 182 (Figs. 11 and 12) having a common terminal 183 and having terminals 184 and 185 across which is connected a condenser 186a. When the terminals 183 and 184 are energized, the motor 178 turns in a direction to move the cam shaft 177 in a clockwise direction. When the terminals 183 and 185 are energized, the cam shaft 177 is turned in a counterclockwise direction.

The driving mechanism is controlled by an arm 186 fixed to the rock shaft 65. The arm 186 yieldably and adjustably carries a roller 187 which is urged by the tension spring 170 against the cam 176. The spring 170 as shown in Fig. 9 is connected between the arms 160 and 186. When the arm 186 is in the position shown in Fig. 12, the mechanism is in the position shown in Fig. 11 in which the shaft 68 is stationary. When the arm 186 is in the position of Fig. 13, the rock shaft 65 is moved in a counterclockwise direction from the position shown in Fig. 11, moving the rack 58 into engagement with the pinion 67 and establishing an oscillating driving connection to the shaft 68. When the arm 186 is in the position shown in Fig. 14, the rock shaft 65 is moved in a clockwise direction from the position shown in Fig. 11, moving the clutch 71 into engagement with the pinion 70 and establishing a high speed rotational drive to the shaft 68.

Water is supplied to the machine through a pipe 187a (Fig. 9) connected to the hot water supply and a pipe 188 connected to the cold water supply. These pipes are led in through rubber bushings 189 (Fig. 9) in the rear wall of the skirt 22. The pipes extend above the supporting ring 23 to the right-hand front corner of the machine and extend up through the bottom wall 21 of the outer casing in the corner of the machine. Above the bottom wall 21 of the machine is a trough 190 (Fig. 6) having a down-turned flange 191 fixed to the casing side walls and having an upturned circular flange 192 at its inner edge. The flange 192 cooperates with the casing side walls to provide an annular trough for receiving liquid centrifugally discharged from the receptacle. As shown in Fig. 6, the flange 192 defines an opening of larger diameter than the diameter of the receptacle 117. It has been found that the trough 190 need not extend beneath the bottom of the receptacle 117 since substantially all of the liquid centrifugally discharged from the receptacle strikes the casing side walls and runs down the walls into the relatively narrow trough provided.

The pipes 187a and 188 extend up through the trough 190 and are connected to a mixing valve 193, as shown more clearly in Figs. 5 and 22. The proportion of hot and cold water admitted to the mixing valve is controlled by a hollow plunger 194, the position of which is controlled by a thermostatic blade 195 carried by an arm 196 pivoted at 197 on the valve chamber. The setting of the thermostatic blade 195 is adjusted by means of a spindle 198 which is threaded in a plug 199 in the side walls of the valve chamber. The inner end of the spindle 198 is enclosed by a Sylphon bellows 200 fixed to the plug 199. The plug 199 is clamped to the casing side wall by a nut 201 threaded thereon so that it serves as a support for the mixing valve. The arm 196 is held against the end of the spindle 198 by a spring 202 arranged between a seat 203 on the arm and a seat 204 in a plug threaded in the side of the mixing valve chamber. With this arrangement it is possible to change the position of the thermostatic blade 195 so as to vary the temperature of the water discharged from the mixing valve. The lower end of the thermostatic blade is connected by a tongue and groove to the plunger 194. In the position illustrated in Fig. 22, the hot water supply is cut off completely and cold water is admitted to the mixing valve through a port 205 and around an annular groove 206 in the plunger 194. The proportion of hot and cold water is varied by longitudinal movement of the plunger. Since the plunger 194 is hollow, it is substantially unaffected by water pressure and can be easily moved by the thermostatic blade.

As shown in Fig. 23, the plunger is guided in cylindrical walls cut away at the top.

At the upper end of the thermostatic valve is a passage 207 conducting the mixed water to a faucet 208 discharging to the trough 190. The flow through the faucet is controlled by a valve 209 on a spindle 210. For convenience, the spindle 210 is provided with a knob 211. The spindle 198 is provided with a knob 212. As shown in Fig. 20, the knob 211 is movable between the on and off positions while the knob 212 is movable to adjust the mixing valve to cold, medium, and hot temperatures.

When the faucet 208 is turned on, the machine is manually filled. When the faucet is turned off, the hot and cold water supply is still connected to the mixing valve chamber.

In the top of the mixing valve is a chamber 213 connected by a conduit 214 to one end 215a of a T-connection 215 (Figs. 5 and 25). From the center of the T is a restricted outlet plug 216 which is connected by a flexible rubber hose 217 to a discharge nozzle 218 which directs a stream of rinse water onto the agitator during centrifugal drying. This effects a spray rinse of the clothes in a manner well understood in the art.

The introduction of liquid for spray rinse liquid is controlled by a spray rinse solenoid 219, shown in Fig. 24, having a plunger 220 which is lifted when the solenoid is energized opening a needle valve 221 and connecting a conduit 222 from the cold water supply (Fig. 5) through a conduit 223 to the top of the chamber 213 (Fig. 23). The water introduced from the conduit 223 acts on a plunger 224 (Fig. 22) and moves it downward, opening a valve 225 and admitting water from the mixing valve down to the chamber 213 and conduit 214. This discharges spray rinse water into the receptacle at a temperature controlled by the adjustment of the mixing valve. Upon deenergization of the spray rinse solenoid 219, the needle valve falls by gravity to the position shown in Fig. 24, shutting off the cold water supply from the conduit 223. This permits the plunger to be moved upward to close the valve 225 by the coil spring 226, shutting off the supply of rinsing liquid.

The liquid discharged from the faucet 208 into the trough 190 during the manual filling operation flows from the trough to the bottom of the casing through a discharge tube or spout 227 (Fig. 26) fixed to the trough directly above an outlet 228 in the casing bottom wall 21. The outlet 228 is connected by a conduit 229 to the inlet of a pump 230. The outlet of the pump is connected by a conduit 231 to the lower end of a tube 232 which extends up through the bottom wall of the casing and through the trough 190. The upper end of the tube 232 is closed. Within the tube 232 is a freely slidable tubular valve 233 which is closed at its upper end and which has ports 234 and 235 in its side walls. When the tube 233 is in the upper position shown in Fig. 26, the port 235 registers with the open end of a conduit 236 fixed to the side walls of the tube 232. The conduit 236 has a discharge nozzle 237 discharging onto the top of an annular filter 238 onto the top of the receptacle. The filter (Figs. 5 and 6) comprises a wire mesh screen having at its outer edge a ring 239 frictionally held on the rim 240 of the receptacle and at its inner edge a funnel-shaped ring 241 which provides an opening through which the spray rinse liquid may be introduced from the nozzle 218. The rings 239 and 241 are conected by spaced radial bracing members 242.

The liquid discharged onto the filter from the nozzle 237 drains into the receptacle, and the excess liquid in the receptacle overflows to the casing through the openings 118. During washing, liquid is continuously pumped from the bottom of the casing onto the filter, and the liquid is therefore continuously circulated and filtered. Any solid particles suspended in the washing solution are therefore caught on the top of the filter. If the filter becomes clogged, the liquid discharged onto the filter will flow over its outer edge due to the greater height of the ring 241 and will be returned to the casing.

By downward movement of the tube 233, the port 235 is moved below the conduit 236, shutting off the flow of water thereto, and the port 234 is moved into register with a conduit 243 connected to a drain. In this position (Fig. 27) the liquid contents of the casing may be pumped to the drain. In this position a tubular sleeve 244 slidably carried on the spout 227 is moved downward so that a rubber sleeve 245 on the lower end thereof engages the outer edges of the drain opening 228, thereby directly connecting the trough 190 with the pump inlet. This downward movement of the sleeve 244 is effected by an arm 246 fixed to the tube 233 and extending through an elongated slot 247 in the side walls of the tube 232. The arm engages a flange 248 fixed to the sleeve 244. When the tube 233 is moved upward, the sleeve 244 is returned to the position shown in Fig. 26 by a coil spring 249 arranged between a flange 250 on the spout 227 and a shoulder 251 on the sleeve 244. When the sleeve 244 is in the lowered position, any liquid in the trough 190 will be pumped to the drain.

During washing and during the first part of the centrifugal drying when the washing solution is being centrifugally extracted from the clothes, the parts occupy the position of Fig. 26 in which any liquid falling in the trough 190 is returned to the bottom of the casing.

During rinsing, when spray rinse liquid is being introduced through the conduit 218, the sleeve 244 should occupy the position shown in Fig. 27 so that the rinse liquid will be discharged directly to the pump inlet and will not be mixed with the washing solution. It is therefore apparent that the sleeve 244 should be moved downward only when spray rinse liquid is being introduced. This is accomplished by a conduit 252 which conducts spray rinse liquid from the T-fitting 215 into the upper end of the tube 232. This liquid acts on the closed end 253 of the tube 233, which serves as a piston, and forces the tube downward. As soon as the spray rinse liquid supply stops, the tube is returned to the upper position by the spring 249.

The pump 230, as shown in Fig. 9, is rigidly supported on the gear casing 51. It is driven by means of a pulley 254 integral with the continuously driven pulley 48. A belt 255 running over the pulley 254 drives a pulley 256 loose on the pump shaft 257. On the inner face of the pulley 256 (Fig. 34) is a clutch member 258 which is pressed by a spring 259 against a friction disk 260 fixed on the pulley. The clutch member 258 provides a slip connection to the pulley. The driving connection to the pump is effected by a clutch member 261 splined on the pump shaft 257 and having an ear 262 adapted to cooperate with the clutch member 258. The splined clutch member 261 is moved into and out of cooperation with the pulley clutch member 258 by means of a yoke 263 operated by a solenoid 264. The yoke 263 is pivoted on an adjustable pivot 265. When the solenoid 264 is energized, the yoke is moved to the left as viewed in Fig. 34, moving the clutch member 262 to a position establishing a driving connection to the pump. The pivot point 265 is adjusted so that the clutch member 262 has a floating engagement with the clutch member 258, i. e., there is no end thrust during driving. When the solenoid is deenergized, the spring 266 returns the solenoid to the position illustrated in Fig. 11 in which the driving connection to the pump is broken. In this condition the pump shaft is stationary and there is no objection to end thrust of the clutch member 262.

With the above described arrangement, the pump is driven when the main driving motor 41 and the pump solenoid 264 are energized.

At the conclusion of the washing and drying operations it is desirable that the tub be emptied under a manual control. This is effected by a rod 267 which extends from the upper end of the casing down through a sleeve 268 fixed to the trough 190 and is connected at its lower end to the arm 246. By lifting the rod 267 to the upper position shown in Fig. 28, the tube 233 is lifted to a position in which its lower end is above a ball 269. The ball fits in an opening 270 in a casting 271 surrounding the lower end of the tube 232. When in the position shown in Fig. 29, the ball extends through an opening 272 in the side walls of the tube 232. The opening 272 is of smaller diameter than the ball (Fig. 29) so that the edges of the opening limit the movement of the ball. The opposite side of the opening 270 is sealed by a flexible diaphragm 274 fixed between the casting 271 and the housing 275 of a switch hereinafter termed the "tub emptying switch." Within the switch housing is a spring-pressed plunger 276 which is biased by a spring 277 to the left as viewed in Fig. 28. The right-hand end of the plunger cooperates with a resilient contact arm 278. When the contact arm is in its normal position shown in Figs. 26 and 27, contacts 279 and 280 are closed. These contacts control the supply of electricity to the automatic control which will be hereinafter described. In other words, while the contacts 279 and 280 are closed, it is possible to automatically control the operation of the washing machine. When the rod 267 is in the raised position shown in Fig. 28, the contacts 279 and 280 are open. Since the switch plunger 276 is now moved clear of the resilient arm 278, this arm now moves to a position closing contacts 281 and 282 and contacts 283 and 284. Contacts 281 and 284 are electrically connected together. The contacts 283 and 284, when closed, energize the pump solenoid. The contacts 281 and 282 energize the main driving motor 41. Since under these conditions the pump is driven, any liquid in the bottom of the casing will be pumped from the casing out through the drain conduit 243. In the upper position of the tube 233 the port 235 is above the conduit 236 so that the connection for circulating water to the receptacle is shut off. In the position of Fig. 28, the ball 269 serves as a detent for holding the control rod 267 in its upper position. It is therefore necessary to positively lower the control rod 267 to stop the emptying of the tub.

The automatic operation of the washing machine is controlled by a timing motor and associated parts, shown in Fig. 17. This construction comprises a timing motor 285 which drives a shaft 286 at a speed of one revolution per minute through reduction gearing contained in a sealed casing 287. The shaft 286 has fixed thereon a pinion 288 meshing with a gear 289 slidably and rotatably carried on a shaft 290. Integral with the gear 289 is a pinion 291 meshing with a gear 292 fixed on a control shaft 293. The control shaft 293 is slidably and rotatably carried in frame members 294 and 295, its axial position being maintained by a spring detent 296 cooperating with a tapered collar 297 fixed on the control shaft. The shaft is urged to the right by a spring 293a arranged between the frame 294 and a collar 293b fixed on the shaft. Outside the frame member 295 is a control knob 298 which fits over a sleeve 299 (Fig. 18) pinned to the control shaft. The sleeve 299 and the knob 298 are connected by a friction connection comprising a split ring 300 resiliently gripping the outer surface of the sleeve 299 and being connected to the control knob 298 by a set screw 301, the inner end of which loosely fits in an opening 302 in the ring 300. The sleeve 299 has a continuous annular groove 303 providing a clearance for the inner end of the set screw 301. As shown in Fig. 18, the split ring 300 fits in an annular groove on the outer surface of the sleeve 299 so that endwise movement of the control knob relative to the sleeve is prevented.

By pulling on the control knob 298 the control shaft 293 can be moved axially to a position in which the collar 297 is on the opposite side of the resilient detent 296. In this position the gear 292 is out of mesh with the pinion 291 and the control shaft can be freely turned independent of the timing motor. Upon pushing the control knob inward, the control shaft is returned to the position illustrated. If the teeth on the gear 292 are aligned with the teeth on the pinion 291, the pinion 291 is pushed inward, and, upon rotation to a position in which the teeth are properly located, is returned by a spring 303a acting on the gear 289. While the gear 292 is in mesh with the pinion 291 it is impossible to turn the control shaft 293 manually due to the high gear reduction. The slip clutch between the control knob and the control shaft limits the force which the operator can apply to the control shaft.

On the far end of the control shaft and insulated therefrom is fixed an arm 304 carrying resilient brushes 305 and 306. The brushes are integral with an arm 307 which is electrically connected by means of a tubular sleeve 308 to a segment 309. The brush contact pressure is maintained by a spring 293a surrounding the shaft 293. The segment 309 is fixed to a plate 310 of insulating material and is electrically connected to one side of the line through the normally closed contacts 279 and 280. For convenience in description the segment 309 will be termed the "neutral" segment. Brush 306 cooperates with segments 311, 312, 313, and 314. Brush 305 cooperates with segment 315, and in parallel with brush 306 it also cooperates with segments 312 and 314. As the timing motor 285 rotates, the brushes 305 and 306 are moved in a clockwise direction, as viewed in Figs. 12 and 17, over the segments. The complete revolution of the timing control shaft normally takes about forty minutes. The knob 298 rotates with the shaft, and its position as shown in Fig. 20 indicates the progress of the washing.

Before starting the automatic washing and drying operations the operator first manually fills the machine by turning on the faucet 211, causing the machine to be filled with water at a temperature selected by adjustment of the knob 212 on the thermostatic mixing valve. The water falls into the annular trough 190 and drains therefrom through the spout 227. The filling operation continues until the liquid level as observed from the window 19 in the front of the casing reaches the line 20.

At this time the control is in the "off" position shown in Fig. 12 in which all of the control is deenergized. To start the automatic operation of the control, the operator turns the control knob 298 manually to a position in which the brush 305 rests on the pump segment 315 and the brush 306 rests on the washing segment 311, first pulling it outward to release it from the timing gears and then pushing it inward to reengage the gears.

The neutral segment 309 is connected to one side of the line 317 through conductor 318, contacts 279 and 280, and conductor 309a during the automatic operation. It will be considered as one side of the line during the subsequent description.

Upon contact of the brush 305 with the pump segment 315, the pump solenoid is energized by a circuit extending from the neutral segment 309 (line 317) through brush 305, the pump segment 315, and conductor 315a to the pump solenoid 264, and therefrom through conductor 319 to the other side of the line 320. Upon energization of the pump solenoid the clutch member 262 is moved into engagement with the clutch member 258, completing a driving connection to the pump from the driving motor 41.

The engagement of the brush 306 with the wash segment 311 completes a circuit from the neutral segment 309 through the brush 306 and the wash segment 311 to terminal 185 of the shifting motor 178 through a circuit including conductor 321, contact arm 322, contacts 323, and conductors 324 and 325. The common terminal 183 of the shifting motor is permanently connected by conductor 326 to the other side of the line 320. Energization of the terminal 185 of the shifting motor 178 causes the shifting motor to turn a control shaft 327 through gear 179 fixed thereto in a clockwise direction and, through the gear 180, to turn the cam shaft 177 in a counterclockwise direction and at a slightly greater rate due to the relative sizes of the gears. The control shaft 327 has fixed thereon cams 328, 329 and 330. Upon rotation of the shifting motor 178, the control shaft 327 and the cam shaft 177 are turned from the position shown in Fig. 12 to the position shown in Fig. 13. In the position shown in Fig. 13, the circuit to the shifting motor terminal 185 is broken by engagement of the projection 331 on the cam 328 with the contact arm 322, thereby opening the contacts 323. Roller 171 now fits in depression 171a in cam 156, stopping rotation of the cam and control shafts. At the same time the raised portion 332 on the cam 330 is moved clear of the contact arm 333, permitting closure of the contacts 334. The closure of the contacts 334 completes a circuit to the main driving motor 41 through a circuit extending from one side of the line 317 through conductor 335, contact arm 333, contacts 334, conductors 336, 337, motor 41, and conductor 338, to the other side of the line 320. Since the pump solenoid has already been energized to move the pump clutch 262 to the driving position, this starts the rotation of the pump, causing water to be pumped from the bottom of the casing up through the tubes 232 and 233 and through the conduit 236 onto the filter 238 which drains into the receptacle.

Upon rotation of the cam shaft 177 to the position of Fig. 13, the cam 176 acting through the cam follower 187 turns the arm 186 in a counterclockwise direction, as viewed in Figs. 11 and 13. This rotates the shaft 65 and moves the rack 58 from the position shown in Fig. 11 into mesh with the pinion 67, causing the shaft 68 and the shaft 95 connected thereto to be oscillated at the desired rate. Since the agitator 141 is directly connected to the upper end of the shaft 95, it is agitated in the receptacle 117. The receptacle remains substantially stationary since it is rotatably supported on the shaft 95 by the bearings 130 and 136. Due to the forces of the water currents set up by the agitator, the receptacle may have a slight movement. This movement is insufficient to affect the washing operation.

When the receptacle is filled, the washing compound and clothes are put in the receptacle. The pump circulates washing solution from the casing onto the filter throughout the washing operation. The excess liquid overflows through the receptacle openings 118 carrying with it floating solid particles of dirt and soap curd. The overflowing liquid falls into the casing from which it is returned to the top of the filter 238 which removes the solid particles. The continuous circulation and filtering of the washing solution maintains it in a clean condition.

The closure of the contacts 334 energizes the timing motor 285 through a circuit extending from one side of the line 317 through conductor 335, contact arm 333, contacts 334, conductor 336 and conductor 339 to the timing motor 285 and from the timing motor through conductor 326 to the other side of the line 320.

The timing motor does not start until the main driving motor 41 is energized. This means that the automatic operation controlled by the timing motor takes place only when the main driving motor is running to carry out the sequence of operations.

The washing operation continues until the timing shaft 293 is rotated by the timing motor through an angle sufficient to move the brush 306 off the washing segment 311. The washing time may be shortened by manually moving the timing shaft. During this time the brush 305 engages the pump segment 315. The pump is accordingly operated continuously during the washing operation, withdrawing washing solution from the bottom of the tub through the opening 228 and discharging it up through the tube 233, the port 235, and the conduit 236 and nozzle 237 onto the filter 238 on top of the receptacle. The liquid discharged thereon drains into the receptacle, causing the receptacle to overflow through the openings 118. With this arrangement washing solution is continually withdrawn from the receptacle through the openings 118 and is returned to the receptacle through the filter 238. This removes lint and other solid particles from the washing solution.

When the timing shaft 293 rotates to a position in which the brush 306 moves off the washing segment, the brush immediately engages the spinning segment 312 which is electrically connected by conductors 340 and 341 to the spinning segment 314. This completes a circuit to the terminal 184 of the shifting motor 178 through a circuit extending from the neutral segment 309 through the brush 306 to the spinning segment 312 and from the spinning segment through conductor 340 to the contact arm 342, contacts 343, and conductor 344 to the terminal 184. The neutral segment is connected, as described above, to the line conductor 317. The motor terminal 183 is permanently connected to the line conductor 320. The shifting motor is accordingly energized to cause rotation of the control shaft 327 in a counterclockwise direction, as viewed in Fig. 12, and, accordingly, to cause rotation of the cam shaft 177 in a clockwise direction. The rotation of the control shaft 327 continues until the projection 331 on the cam 328 engages the contact arm 342 and opens the contact 343, thus deenergizing the shifting motor. At this time the roller 171 engages depression 171b in cam 156 stopping the rotation. The rotation of the cam shaft 177 from the position shown in Fig. 13 to the position of Fig. 14 moves the cam 176 to a position permitting movement of the shaft 65 in a clockwise direction, as viewed in Fig. 11, moving the clutch 71 into engagement with the continuously rotating pinion 76 and causing the shaft 68 to be rotated at a high speed. As explained above, as soon as the shaft speed exceeds a few hundred R. P. M., the clutch shoes 147 are forced outward centrifugally into engagement with the inner surface of the receptacle hub 123, establishing a high speed driving connection to the receptacle. Since the agitator is splined on the shaft 95, the receptacle and agitator rotate in unison. The rotation of the receptacle centrifugally extracts the washing solution from the clothes, the washing solution being caught in the trough 190 and returned to the bottom of the casing through spout 227.

It will be noted that the main driving motor 41 is deenergized between the shift from washing to spinning by opening of the contacts 334 by the projection 332. The clutch 71 is therefore shifted to the engaged position while the power is off.

As clearly shown in Fig. 12, the pump segment 315 extends slightly beyond the left-hand end of the washing segment 311. The operation of the pump therefore continues after the washing operation stops and during the first part of the drying or extracting operation. This means that washing solution is discharged onto the filter 238 at the beginning of the drying operation. At first the liquid flows through the filter. As the speed of rotation increases, less of the liquid flows through the filter and the liquid on top of the filter is thrown outward across the upper surface of the filter under the action of centrifugal force, flushing solid particles off the filter. The flushing operation takes place immediately following the washing operation, and, since liquid is being continually discharged onto the filter, the solid particles are flushed off the filter before the filter has had a chance to dry. This materially increases the effectiveness of the filter flushing operation.

The filter flushing operation takes place during the first part of the drying or extracting operation. At the end of the filter flushing, the brush 305 rides off the inclined end of the pump segment 315 and engages the drying or spinning segment 312. This effects no change in the control since the brush 306 is at this time engaging the spinning segment.

After a few minutes of centrifugal drying during which most of the washing solution is centrifugally extracted from the clothes the shaft 293 turns the brush 306 to a position in which it engages the rinse segment 313. This completes a circuit from the neutral segment 309 through brush 306, rinse segment 313, and conductor 346 to the spray rinse solenoid 219, and from the spray rinse solenoid through conductor 319 to the other side of the line 320.

Energizing of the spray rinse solenoid 219 lifts the plunger 220 and needle valve 221 (Fig. 24), permitting cold water to flow from the conduit 188 through conduits 222 and 223 to the upper end of the thermostatic mixing valve 193. The water pressure forces the piston 224 downward, opening the valve 225 and permitting water to flow from the thermostatic valve mixing chamber through conduit 214 to the T-fitting 215. From this fitting the rinse water is discharged through the flexible hose 217 and a nozzle 218 through the ring 241 onto the upper end of the agitator. Upon striking the agitator, the liquid is diffused and thrown outward by centrifugal force through the clothes which line the side walls of the receptacle. The spray rinse liquid removes the soluble part of the washing solution remaining in the clothes at the end of the preliminary drying operation. From the T-fitting 215 the spray rinse liquid flows through the conduit 252 to the upper end of the tube 232, creating a pressure between the upper end of the tube 232 and the closed upper end 253 of the tube 233 which forces the tube 233 downward to the position shown in Fig. 27. In this position the port 235 in the tube 233 is moved below the end of conduit 236 and the rubber ring 245 on the lower end of the sleeve 249 is moved into engagement with the bottom of the tub around the tub drain opening 228. The port 234 in the lower end of the tube 233 is moved into register with the conduit 243 leading to a drain.

After passing through the clothes, the spray rinse liquid is centrifugally discharged from the receptacle through the openings 118 against the side walls of the casing and falls into the annular trough 190. From the trough the liquid drains through the spout 227 and the tube 249 into the pump inlet, from which it is discharged to the drain through conduit 231, port 234, and drain conduit 243. The spray rinse liquid is therefore pumped directly to the drain and does not mix with the washing solution which is stored in the lower part of the casing during the drying operation. The spray rinse segment 313 and the pump segment 315 are so related that the spray rinse segment is first contacted by the brush 306, and after the spray rinse solenoid 219 has been actuated to introduce the rinse liquid into the receptacle and to shift the pump discharge to the drain conduit 243, the pump segment is then engaged by the brush 305 to start the operation of the pump. In the interval between the introduction of the spray rinse liquid and the starting of the pump, the liquid discharged from the receptacle is caught in the trough 190. The capacity of the trough is sufficient to hold this liquid.

The introduction of spray rinse liquid continues during the time required by the timing shaft 293 for moving the brush 306 off the spray rinse segment 313. When the brush 306 moves off the rinse segment, it falls onto the spinning segment 314. This makes no change in the operation of the machine since the receptacle is at this time being rotated at its extracting or drying speed. Upon deenergizing of the spray rinse solenoid 219 by the opening of the circuit through the rinse segment, the plunger 220 of the spray rinse solenoid falls, causing the needle valve 221 to close the conduit 223 and cut off the water supply to the chamber at the upper end of the thermostatic mixing valve. Upon release of the pressure, the spring 226 moves the piston 224 upward, closing the valve 225 and shutting off the spray rinse liquid. This permits the tube 233 and the sleeve 244 to be returned to the position shown in Fig. 26 by the coil spring 249. Shortly before the deenergizing of the spray rinse solenoid, the brush 305 moves off the pump segment 315, deenergizing the pump solenoid and stopping the operation of the pump. This prevents a surge of water up through the tube 233 upon return of the tube to the position of Fig. 26.

The drying operation continues while the brushes 305 and 306 are in contact with the spinning segment 314. The interval is sufficiently long to enable the clothes to become thoroughly dry. Upon engagement of the brushes 305 and 306 with the "off" segment 316, a circuit is completed to terminal 185 of the shifting motor from the neutral segment 309 through brushes 305 and 306, segment 316, conductor 347, contact arm 348, contacts 349, and conductor 325. This causes the shifting motor to rotate the control shaft 327 in a clockwise direction, as viewed in Fig. 12, and the cam shaft 177 in a counterclockwise direction. The rotation of the shafts continues until the parts have returned to the position of Fig. 12 in which the projection 350 on cam 329 engages the contact arm 348 and opens the contacts 349, stopping the rotation of the shifting motor. In this position the projection 332 on the cam 330 engages the contact arm 333 and opens contacts 334 in the circuit of the main driving motor 41, stopping the motor. This also stops the timer motor 285. The rotation of the cam shaft 177 rotates the cam 176 to a position returning the cam follower 187 to the position of Fig. 11 in which the shaft 68 is disconnected from the driving motor. The rotation of the cam 156 to the position of Fig. 12 permits pivoting of the brake arm 160 by the spring 170 to a position causing the brake shoe 59 to contact the brake drum 89. Since the brake drum is rotating in the direction of the arrow (counterclockwise), the frictional torque exerted on the brake shoe by the brake drum causes further pivoting of the brake arm to a position in which the roller 171 engages the depression 173. In this position the pivot 168 for the brake shoe is slightly above a center line connecting the stud 161 and the shaft 68. The brake shoe is accordingly wedged against the brake drum by the friction torque. The braking pressure is limited by the coil spring 163, as described above.

If the brushes 305 and 306 remain on the segment 316 until the rotation of the receptacle has stopped, the brake arm will then be returned to the position shown in Fig. 12 by the action of the coil spring 163. This is due to the fact that the pivot 168 for the brake shoe is above the center line connecting the stud 161 and the shaft 68.

Since it takes an appreciable time for the brake to stop the rotation of the receptacle and since the shaft 293 can at all times be manually turned, there is some danger that the operator may inadvertently shift the shaft 293 to a washing position while the receptacle is rotating. This would obviously be dangerous since the shaft 68 cannot be suddenly changed from high speed rotation, the condition present during drying, to low speed oscillation, the condition present during washing.

If the brushes 305 and 306 are moved manually from the spinning to the washing segment 311 while the receptacle is rotating without first contacting the off segment, a connection will be completed to the terminal 185 of the shifting motor 178 from the neutral segment through the washing segment 311, conductor 321, contact arm 322, contacts 323 and conductors 324 and 325. This will complete a circuit to the shifting motor causing clockwise rotation of the control shaft 327 and counterclockwise rotation of the cam shaft 177. This rotation continues until the parts occupy the position of Fig. 15 in which a projection 351 on the cam 328 engages the contact arm 322 and opens the contacts 323. In this position the projection 332 on the cam 330 opens the contacts 334 in the main driving motor and timing motor circuits and the cam shaft 177 is in a position corresponding to the neutral position of the rock shaft 65, shown in Fig. 11, in which the motor 41 is disconnected from the shaft 68. The projection 351 on the cam 328 is a safety projection preventing damage of the mechanism by shifting to the washing position while the receptacle is rotating.

If the brushes 305 and 306 are returned to the "off" segment 316 while the control shaft is in the position of Fig. 15, a circuit will be completed to the terminal 185 of the shifting motor from the neutral segment through brushes 305 and 306, segment 316, conductor 347, contact arm 348, contacts 349, and conductor 325. This will cause rotation of the control shaft 327 in a clockwise direction to the position of Fig. 12 in which the projection 350 on the cam 329 opens the contacts 349.

If the brushes 305 and 306 are manually returned in a clockwise direction to the washing segment 311 from position of Fig. 12 while the receptacle is still rotating, a connection will be completed to the terminal 185 of the shifting motor 178 from the neutral segment through the washing segment 311, conductor 321, contact arm 322, contacts 323, and conductors 324 and 325. This will cause rotation of the cam shaft 177 in a counterclockwise direction from the position of Fig. 12 to the position of Fig. 16. This rotates the cam 156 to a position in which the roller 171 on the brake arm 160 is over a locking depression or notch 175 in the cam. The roller of the brake arm is moved into this depression by the friction torque exerted on the brake shoe by the brake drum, effectively locking the cam shaft against further rotation. The parts will be held in this position until rotation of the receptacle has stopped and the brake arm is moved out of the depression 175 by the spring 163. This is possible only after the rotation of the receptacle has stopped, since only at this time will the friction torque on the brake shoe be eliminated. If the roller should stick in the depression 175 it will be forced out of the depression by the rotation of the cam 156 by the shift motor as soon as the receptacle is stopped. This is possible due to the decrease in friction torque which is the force wedging the brake arm in the depression. As soon as the roller 171 on the brake arm moves out of the depression, the rotation of the cam shaft is free to continue to the washing position shown in Fig. 13.

If the brushes 305 and 306 are returned to the segment 316 while the parts are in the position shown in Fig. 16, a circuit will be completed to terminal 184 of the shifting motor from the neutral segment through brushes 305 and 306, segment 316, conductor 347, conductor 352, contact arm 353, contacts 354, and conductor 344. This energizes the shifting motor to cause counterclockwise rotation of the control shaft 327. Due to the fact that the roller 171 is at this time held in the depression 175 by the friction torque exerted by the brake drum on the brake shoe, such rotation of the control shaft is not possible until rotation of the receptacle has stopped and the roller 171 has been moved out of the depression 175 by the spring 163. As soon as this condition obtains, the control shaft 327 is rotated in a counterclockwise direction to the position of Fig. 12, in which position the projection 350 on the cam 329 engages the contact arm 353 and opens the contacts 354.

From the above description it is apparent that an automatic control has been provided for carrying out a sequence of washing and drying operations in which each of the operations may be initiated manually and in which the apparatus cannot be damaged by improper use.

At the conclusion of the washing and drying operations, the washing solution is returned to the bottom of the casing, from which it may be pumped into the receptacle to wash another load of clothes in the automatic sequence described above.

The above-described arrangement for controlling the washing, rinsing, and drying and for flushing the filter is being claimed in my divisional application Serial No. 359,260, filed October 1, 1940.

The washing solution may be pumped from the tub by lifting the rod 267 upward to the position shown in Fig. 28. This moves the lower end of the tube 233 above the drain conduit 243, permitting the ball 269 to move inward under the action of spring 277 and thereby move the switch plunger 276 away from the spring arm 278, permitting the spring arm to close the contacts 281, 282, 283, and 284, and open contacts 279 and 280. The opening of the contacts 279 and 280 opens the circuit to the neutral segment 309 and cuts out the automatic control. The closure of contacts 281 and 282 closes a circuit to the main driving motor extending from one side of the line 317 through conductor 318, contacts 281 and 282, conductors 355, 337, motor 41 and conductor 338, to the other side of the line 320. This starts the rotation of the main driving motor 41. The closure of the contacts 283 and 284 completes a circuit to the pump solenoid 264 through a circuit extending from one side of the line 320 through conductor 319, solenoid 264, conductor 356, contacts 283, 284, 281 and 282, and conductor 318, to the other side of the line 317. This energizes the pump solenoid and causes the pump clutch 262 to be moved into engagement with the pulley 256 driven by the driving motor 41. At this time the port 235 in the tube 233 is above the opening to the conduit 236. The pump accordingly discharges directly to the drain conduit 243. The ball 269 provides a detent for holding the rod 267 in the upper position. After the casing is emptied the operator must manually push the rod down to return the machine to the condition for automatic operation.

In Figs. 30 to 33 inclusive is shown a water distribution system interchangeable with the water system described above and shown in Figs. 25 to 29 inclusive. In the following description corresponding reference numerals are used to indicate identical parts.

In this construction the washing solution is conducted from the pump discharge 231 to the conduit 236 discharging on the top of the filter 238 through a tube 357 having its lower end fixed in a sleeve 358 integral with a casting 359. The sleeve 358 projects up through the casing bottom 21 and is secured thereto by a nut 360 threaded on the sleeve. The tube 357 extends up through a rubber bushing 361 in the trough 190 and at its upper end is connected to the conduit 236. The casting 359 has an integral sleeve 362 which is connected to the pump discharge 231. Slidably extending through the tube 357 is a rod 363 for controlling a valve 364 also slidable on the rod. The rod is yieldably connected to the valve by means of a spring 365 arranged between a flange 366 on a sleeve 367 fixed to the valve and a collar 368 pinned to the rod. The valve has a shoulder 369 which limits the upward movement of the valve 364 on the rod by engagement with the underside of the collar 368.

When the valve is in the lower position shown in Fig. 30, it closes a port 370 in a casting 371 fixed to the underside of the casting 359. The drain conduit 243 is fixed in the casting 371. In this position the pump discharge flows through the sleeve 362 and up through a port 372 to the tube 357, and therefrom through the conduit 236 and nozzle 237 to the receptacle. This is the condition present during washing when washing solution is continuously circulated from the bottom of the casing onto the top of the filter 238.

During spray rinsing, the pump discharge should be connected to the drain conduit 243 so that the rinsing liquid caught in the trough 190 will be pumped direct to the drain and will not dilute the washing solution stored in the bottom of the casing. The position of the parts under this condition is shown in Fig. 31.

During spray rinsing, clear water is conducted from the thermostatic mixing valve to the T-connection 215 and is led therefrom through a conduit 252 to the upper end of a sleeve 373 fixed in the trough 190. The upper end of the sleeve 373 is closed by a head 374 clamped thereon by a cap 375. On the upper side of the head 374 is an integral tubular extension 376 around which is arranged a coil compression spring 377. The upper end of the spring engages a seat 378 pinned to a piston rod 379 slidably extending down through the head 374. The upper end of the seat 378 has a rod 380 pivoted therein connected at its other end to a lever 381 pivoted at 382 on the upper end of the tube 357. The other end of the lever 381 engages a collar 383 fixed on the rod 363. The coil spring 377 normally urges the rod 379 to the position shown in Fig. 30 which permits the rod 363 to fall by gravity to the position there shown.

Upon introduction of the spray rinse liquid to the conduit 252, a piston 384 pinned to the piston rod 379 is forced downward in the sleeve 373. The lower end of the piston rod 379 is pinned to a sleeve 385 slidably surrounding the sleeve 373 and having an annular rubber ring 386 secured to its lower end which is adapted to engage the casing bottom 21 around the outlet 228 and shut off the communication of the pump inlet to the casing bottom. In this position the spray rinse liquid which is centrifugally discharged from the rotating receptacle falls into the trough 190 and flows through ports 387a in the sleeve 373 and down through the sleeve 386 to the pump inlet. The lowering of the piston 384 pivots the lever 381, causing it to engage the collar 383 and lift the rod 363 up to a position in which the valve 364 closes the port 372. This opens the port 370 and connects the pump discharge directly to the drain conduit 243. The coil spring 365 provides a yielding connection in this position between the rod 363 and the valve 364.

When the supply of spray rinse liquid is cut off, the piston 384 is moved upward by the spring 377 and the rod 363 returns by gravity to the position shown in Fig. 30.

The tank emptying switch 275 is fixed to the casting 371 having an opening 387 for receiving the ball 269. The inner edges of the opening are chamfered so as to prevent the ball from moving completely through the opening. Under the conditions shown in Figs. 30 and 31 the ball is held in its outer position by a sleeve 388 slidable in an extension 389 on the casting 371. In this position the plunger 276 engages the contact arm 278 and maintains a circuit to the automatic control through contacts 279 and 280. The sleeve 388 has a lost motion connection with the rod 363 which comprises a sleeve 390 pinned to the rod and having flanges 391 and 392 at its upper and lower ends. In the condition shown in Fig. 30, the flange 391 rests against a flange 393 at the upper end of the sleeve 388. In the condition shown in Fig. 31, the flange 392 rests against the lower side of the flange 393. This arrangement permits the sleeve 388 to remain stationary while the rod has a vertical movement equal to the distance between the flanges 391 and 392. This is sufficient to permit the necessary movement of the rod to open and close the ports 370 and 372.

When the tank is to be emptied, the rod 363 is manually lifted to the position shown in Fig. 32. In this position the sleeve 388 is lifted clear of the ball 269 by engagement of the flanges 392 and 393. This permits the ball 269 to move to the left, as viewed in Fig. 32, in which position the spring 277 moves the plunger 276 clear of the contact arm 278 opening the contacts 279 and 280 and closing the contacts 283, 284, 281 and 282. This opens the circuit through the automatic control and closes the circuit to the main driving motor and pump solenoid, starting the operation of the pump. Since in this position the valve 364 closes the port 272 and uncovers the port 370, the pump discharges directly to the drain 243. The ball 269 serves as a detent for holding the sleeve 388 in the position shown. The rod 363 must therefore be manually lowered after completion of the tank emptying operation.

The operation of the water system as described above is identical with the previously described construction.

What I claim as new and desire to secure by Letters Patent of the United States, is:

1. In a combined washing and drying machine, a casing, a receptacle therein in which the clothes are washed and centrifugally dried, a trough for catching the liquid centrifugally discharged from the receptacle, an outlet from the casing, a drain passage from the trough to the casing, a pump having its inlet connected to said outlet, a conduit from the pump outlet extending up through the casing and discharging to the receptacle, a conduit leading from the pump outlet to a drain, valve means connecting the pump outlet to said conduits and connecting the pump inlet to said drain passage, and a control member for said valve means extending through said first conduit.

2. In a combined washing and drying machine, a casing, a receptacle therein in which the clothes are washed and centrifugally dried, a trough for catching the liquid centrifugally discharged from the receptacle, an outlet from the casing, a pump having its inlet connected thereto, a conduit from the trough discharging at all times to the pump inlet, valve means for controlling the connection from the casing to the pump inlet, means for introducing rinsing liquid to the receptacle during drying, and means responsive to the introduction of said rinsing liquid for controlling said valve means.

3. In a combined washing and drying machine, a casing, a receptacle therein in which the clothes are washed and centrifugally dried, a trough for catching the liquid centrifugally discharged from the receptacle, means for draining the trough selectively to the casing or to a drain, the space in the casing below the receptacle during centrifugal drying being sufficient to store the washing solution, means for introducing spray rinse liquid into the receptacle during centrifugal drying to rinse washing solution from the clothes, and means responsive to the introduction of spray rinse liquid for shifting the drain connection of the trough to the drain.

4. In a combined washing and drying machine, a casing, a receptacle therein in which the clothes are washed and centrifugally dried, a trough for catching the liquid centrifugally discharged from the receptacle, valve means for selectively connecting the trough to the casing or to a drain, the space in the casing below the receptacle during centrifugal drying being sufficient to store the washing solution, means for introducing spray rinse liquid into the receptacle under pressure during centrifugal drying to rinse washing solution from the clothes, and means responsive to the pressure of the spray rinse liquid for shifting the valve means to connect the trough to the drain.

5. In a combined washing and drying machine, a casing, a receptacle therein in which clothes are washed and centrifugally dried, an outlet from the casing, a pump having its inlet connected thereto, valve means controlling the connection from the casing to the pump inlet, means for introducing rinsing liquid to the receptacle, and means responsive to the introduction of rinsing liquid for controlling said valve means.

6. In a combined washing and drying machine, a casing, a receptacle therein in which clothes are washed and centrifugally dried, an outlet from the casing, a pump having its inlet connected thereto, a stand pipe having its upper end open and having its lower end movable into and out of engagement with the casing around said outlet, means for introducing rinsing liquid to the receptacle, and means responsive to the introduction of rinsing liquid for effecting movement of the stand pipe into engagement with the casing.

7. In a combined washing and drying machine, a casing, a receptacle therein in which clothes are washed and centrifugally dried, an outlet from the casing, a pump having its inlet connected thereto, a stand pipe discharging to the casing outlet and having a valve connection with the casing, means for introducing rinsing liquid to the receptacle, and means responsive to the introduction of rinsing liquid for closing said valve connection to the casing.

8. In a combined washing and drying machine of the type having a receptacle in which clothes are washed and centrifugally dried, a casing surrounding the receptacle having sufficient space below the receptacle during drying for storage of the washing solution, means for selectively effecting washing in the receptacle and rotating the receptacle for extracting, provisions for introducing rinsing liquid into the receptacle during extracting, a trough surrounding the receptacle for catching the liquid discharged therefrom during extracting, means for selectively conducting the liquid caught in the trough to the casing or to a drain, the improvement which comprises control means movable to positions controlling the washing and extracting operations and for controlling the introduction of rinsing liquid, means responsive to the introduction of rinsing liquid for connecting the trough to a drain, and timing means for moving the control member to the washing, extracting, and rinsing positions in timed sequence.

GEORGE W. DUNHAM.